US011283302B2

(12) United States Patent
Greason

(10) Patent No.: US 11,283,302 B2
(45) Date of Patent: Mar. 22, 2022

(54) NON-GAUSSIAN BEAMS FOR LONG-DISTANCE WIRELESS POWER TRANSMISSION

(71) Applicant: Electric Sky Holdings, Inc., Mercer Island, WA (US)

(72) Inventor: Jeffrey Greason, Midland, TX (US)

(73) Assignee: Electric Sky Holdings, Inc., Mercer Island, WA (US)

( * ) Notice: Subject to any disclaimer, the term of this patent is extended or adjusted under 35 U.S.C. 154(b) by 272 days.

(21) Appl. No.: 16/710,393

(22) Filed: Dec. 11, 2019

(65) Prior Publication Data

US 2020/0195057 A1 Jun. 18, 2020

Related U.S. Application Data

(60) Provisional application No. 62/778,824, filed on Dec. 12, 2018.

(51) Int. Cl.
*H02J 50/20* (2016.01)
*H02J 50/40* (2016.01)
*H01Q 3/30* (2006.01)

(52) U.S. Cl.
CPC .............. *H02J 50/20* (2016.02); *H01Q 3/30* (2013.01); *H02J 50/402* (2020.01)

(58) Field of Classification Search
CPC .. H01Q 3/00; H01Q 3/08; H01Q 3/26; H01Q 3/2611; H01Q 3/2617; H01Q 3/2623; H01Q 3/2629; H01Q 3/2635; H01Q 3/30; H01Q 3/34; H01Q 3/36; H01Q 3/38; H01Q 3/40; H01Q 9/04; H01Q 21/06; H01Q 21/061; H01Q 21/065; H01Q 25/005; H02J 50/20; H02J 50/23; H02J 50/30; H02J 50/40; H02J 50/402
See application file for complete search history.

(56) References Cited

U.S. PATENT DOCUMENTS

| 4,951,061 A | 8/1990 | Lee |
| 2005/0064872 A1 | 3/2005 | Osseiran et al. |
| 2013/0208332 A1 | 8/2013 | Yu et al. |
| 2016/0259175 A1 | 9/2016 | Ellenbogen et al. |
| 2017/0026095 A1 | 1/2017 | Ashrafi et al. |

(Continued)

OTHER PUBLICATIONS

PCT International Search Report and Written Opinion in International Appln. No. PCT/US2019/065666, dated Feb. 25, 2020, 6 pages.

*Primary Examiner* — Levi Gannon
(74) *Attorney, Agent, or Firm* — Fish & Richardson P.C.

(57) ABSTRACT

Systems and techniques are disclosed herein for generating and using Whisper Beams for wireless long-distance power transmission. For example, a radiofrequency (RF) Whisper Beam can focus high energy at great distances, which enables the technology disclosed herein to provide a practical means of transferring high power in a variety of applications and use cases. In some implementations, a method includes configuring an antenna to transmit two or more coherent out-of-phase Gaussian beams along a propagation axis to generate a beam of electromagnetic energy. The beam can be generated to propagate along the propagation axis, form a focus along the propagation axis, and has an intensity along the propagation axis that is less than a highest intensity of the beam off the propagation axis.

20 Claims, 22 Drawing Sheets

(56) References Cited

U.S. PATENT DOCUMENTS

2017/0163451 A1    6/2017  Willner et al.
2019/0341812 A1*  11/2019  Arnstein ................ B64D 47/00
2019/0372234 A1*  12/2019  Lipworth ................ H02J 50/27

* cited by examiner

Airy Function

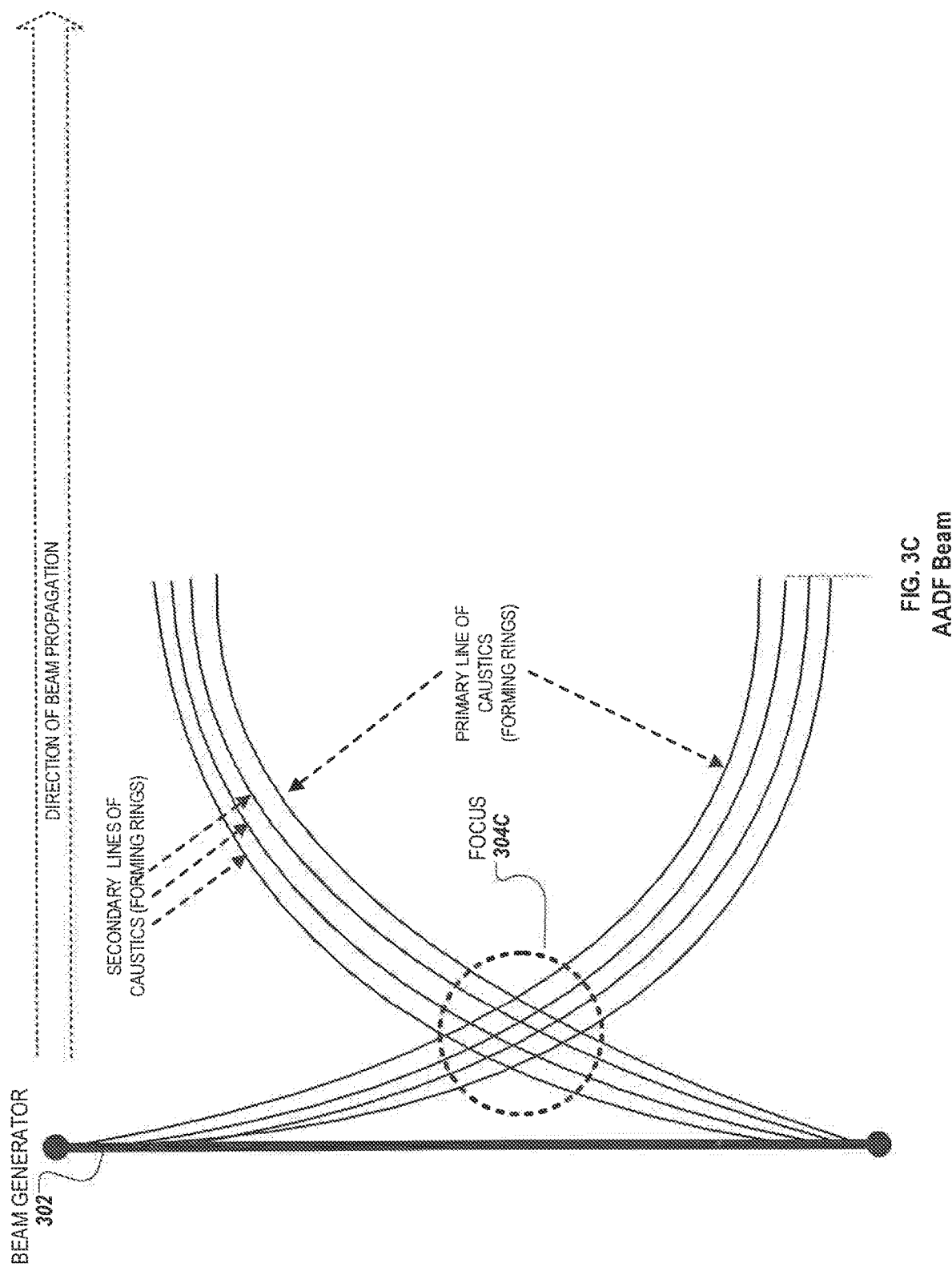

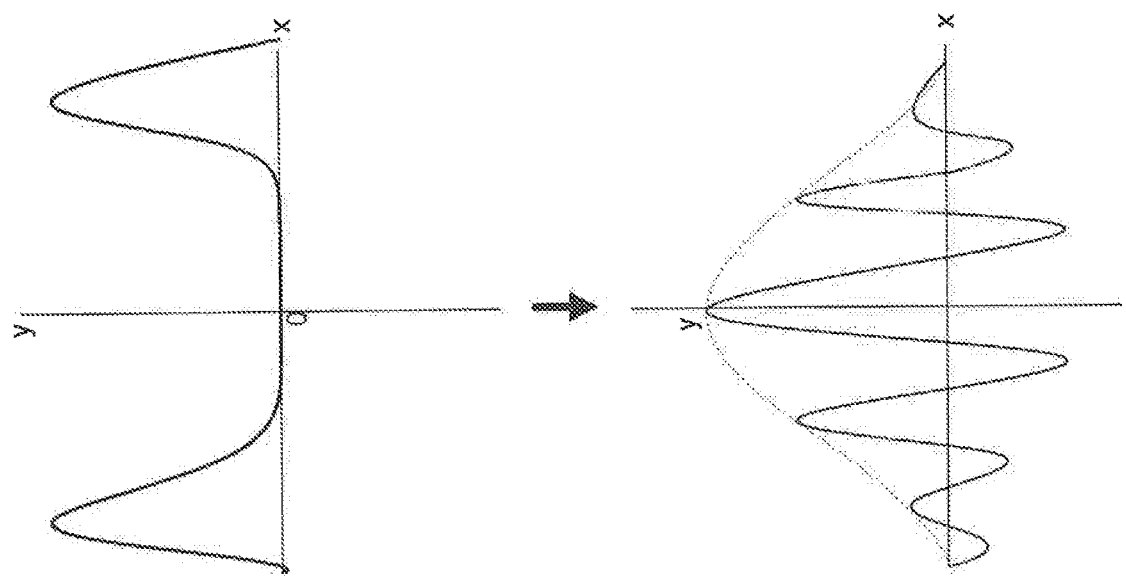

SECTIONAL VIEW

IN-PLANE VIEW

1300

```
┌─────────────────────────────────────────────┐
│ CONFIGURE A FIRST ANTENNA TO PROPOGATE A BEAM│
│         OF ELECTROMAGNETIC ENERGY            │
│                                        1310  │
└─────────────────────────────────────────────┘
                      │
                      ▼
┌─────────────────────────────────────────────┐
│ CONFIGURE A SECOND ANTENNA TO RECEIVE A SIGNAL│
│          ASSOCIATED WITH THE BEAM            │
│                                        1320  │
└─────────────────────────────────────────────┘
```

FIG. 13

NON-GAUSSIAN BEAMS FOR LONG-DISTANCE WIRELESS POWER TRANSMISSION

CROSS-REFERENCE TO RELATED APPLICATION

This application claims priority to U.S. Application Ser. No. 62/778,824, filed on Dec. 12, 2018, which is incorporated by reference in its entirety.

TECHNICAL FIELD

This description is related to wireless power transfer.

BACKGROUND

Mobile and autonomous systems can be powered by batteries and fuel systems. Trends in mobile devices and electric vehicles have improved battery technologies. However, batteries and fuel systems may have an undesirable weight and performance profile.

SUMMARY

Systems and techniques are disclosed for generating and using Whisper Beams for wireless long-distance power transmission. Whisper Beams are a class of Non-Gaussian Beam with a generally diffuse level of intensity along the center axis of propagation, as explained in more detail below (under Terminology). Various types of Non-Gaussian Beams are contemplated to be used with the systems and techniques disclosed herein. As one example, Airy Beams are a type of Non-Gaussian Beam that have been formed at optical wavelengths for bringing light to a first focus, dispersing the beam in an abruptly autodefocusing (AADF) pattern that transitions to an abruptly autofocusing (AAF) pattern to form a second focus.

The systems disclosed herein can include one or more transmitting antennas configured to generate a Whisper Beam and one or more receiving antennas configured to receive a power transmission generated in association with the Whisper Beam. The transmitting antenna(s) can incorporate antenna structures that permit the generation of Whisper Beams in longer wavelengths, such as those that are longer than 1 mm (that is, below approximately 300 GHz, which is referred to as radio frequencies (RF)) for long-range wireless power transmission. Various configurations of the transmitting antenna and the receiving antenna may also be possible depending on the type of Whisper Beam employed.

Because an RF Whisper Beam can focus high energy at great distances, the technology disclosed herein can provide a practical means of transferring high power (e.g., kilowatts to megawatts) over long distances (e.g., hundreds of meters to hundreds of kilometers), and potentially further depending on the focus of a generated RF Whisper Beam. The technology described herein can be packaged for a variety of applications and use cases.

For example, in one use case, the antenna and current driver provide electrical power to electric aircraft and other flight vehicles (e.g., passenger aircraft, unmanned aerial vehicles, urban air mobility vehicles, and space-launch systems). Another use case may be large vehicles on the surface, including container ships, harbor craft, other marine technologies, and railroad locomotives. Other use may be wireless power transfer between two fixed locations, such as from a mainland to an island. Other use cases may include vehicles that travel on roadways and draw power wirelessly from transmitting antennas alongside the road. Accessing grid power on-the-go may be used to extend the range at which an electric vehicle can travel, alleviating anxiety over the range of such a vehicle that is otherwise a hindrance towards purchasing the vehicle.

The antenna structure can also reduce battery weight, reducing energy consumption overhead for carrying the batteries. Other form factors and use cases may support remote charging of mobile devices, such as laptops and wireless phones. Still, other use cases may include industrial form factors (e.g., manufacturing) and powering robotic equipment. Still other applications may include medical devices, such as probing and focusing energy inside a human body. The method can also be used for communications, such as focusing a communications signal.

As another example, the technology disclosed herein can provide low field strength between a transmitter and the receiver by utilizing the parabolic path of Whisper Beams to disperse electromagnetic energy between the transmitter and the receiver and recombine the electromagnetic energy at the receiver. As a result, the strength of the electromagnetic field between the transmitter and the receiver is relatively low, which can be used to create a beam in which humans, vehicles, and other equipment may enter the area between the transmitter and the receiver without being exposed to high electromagnetic field strength.

Additionally, the technology disclosed herein can operate in a manner that is substantially unperturbed by partial obstruction between a transmitter and a receiver. Specifically, use of a Whisper Beam, such as an RF Whisper Beam, as disclosed herein, allows the beam's self-healing properties for the portions that are not blocked to arrive and be captured at the receiver. This aspect can be useful when objects, such as vehicles, travel through and partially block the beam (i.e., between the transmitter and the receiver), without interrupting the remaining power transmission received at the receiver. For example, a receiver on an airplane (or space-launch vehicle) would not be perturbed if other airplanes flew between the receiver and the transmitter.

In some implementations additional transmitters can be stationed down range from a transmitter whenever a near-complete obstruction, such as the Earth's horizon, blocks line-of-sight to a vehicle's receiver as the vehicle travels down range from the transmitter, such that the vehicle comes within line-of-sight of another transmitter.

In other implementations, the techniques disclosed herein can reduce the number of downstream transmitters that may be required to enable large power transmissions over the Earth's horizon. A Whisper Beam can be formed by a series of concentric rings or fringes that carry energy. The outer edges of a Whisper Beam carry a relatively small portion of the beam's total energy. The outer edges of the beam can be partially obstructed (such as by the Earth's horizon) with little loss of power at the receiver. Because the systems disclosed herein can operate in a manner that is substantially unperturbed by partial obstruction between a transmitter and a receiver, the number of transmitters for large power transmissions over the Earth's horizon may be reduced (and potentially to a single transmitter).

As discussed below, the systems disclosed herein can apply other techniques to maximize the received power when the receiver passes close to the horizon. For example, an RF transmitter can be configured to alter a beam's parabolic radius. These alterations can extend the radius of the parabolic path above the horizon to maximize the amount of energy received over the horizon, such as by altering the shape of the RF beam's cross section. For example, if the Earth's horizon intercepts a portion of the inner fringe of the beam it will block a substantial portion of the transmitted power. If the inner fringe is instead "flattened" (so that its horizontal dimension is larger than its vertical dimension), one can lower the angle at which the whole of the inner fringe will not be obstructed by the horizon, such that all of the power in the inner fringe can be received by a receiver that is closer to the horizon. A receiver can also receive energy from just the outer fringes, or a portion of the outer fringes.

In some implementations, the system disclosed herein are configured to generate Whisper Beams that are not in the form of Airy Beams. In other implementations, the systems disclosed herein are configured to generate Whisper Beams in the form of Airy Beams. In some embodiments of such implementations, a transmitting antenna can be placed at or nearby a first focus of the Airy Beam, and a receiving antenna placed at or nearby a second focus (or target focus) of the Airy Beam. The Airy Beam's parabolic (or three-dimensional paraboloid) path between the transmitting antenna and the target focus can allow people and objects to pass through the zone between the transmitting antenna and the receiving antenna without being exposed to high electromagnetic field strength. The systems can utilize the parabolic (or paraboloid) path and self-healing properties of Airy Beams to permit the receiving antenna to receive power even when a transmission path with the transmitting antenna is partially obstructed.

In certain implementations, techniques can be used to provide various improvements over techniques for generating Airy Beams. For example, a system can include a linear array antenna (or an "end fire" array antenna) that lies along an axis that is matched to the same amplitude and phase distribution, to generate an Airy Beam starting from that point. In such implementations, a transmitting antenna can be placed at or near a first focus of the Airy Beam rather than upstream of the first focus. The transmitting antenna can have a linear array of sufficient length required to obtain adequate focus (i.e., sharpness) of a generated Airy Beam.

In some implementations, a system includes a broadside array antenna. The broadside array antenna can be configured to accommodate the amplitude and phase distribution in the immediate neighborhood of foci of Airy Beams, the amplitude and phase distribution in the vicinity of foci of RF Airy Beams being more complex relative to characteristics of foci of optical Airy Beams. This placement can greatly reduce the size of the transmitting antenna. For example, an optical hologram has been focused by a lens in a system analogous to a broadside phased array. These systems take advantage of the relatively-short wavelength of optical frequencies to build transmitters of a size able to accommodate the wavelength generated. Generating Airy Beams at longer wavelengths presents various challenges. For example, simply increasing the size of the transmitter to match the wavelength can become cost-prohibitive, particularly at wavelengths stretching for kilometers or more. Conversely, the systems and techniques disclosed herein may be more challenging at optical frequencies, to the point of being impractical or even infeasible using current fabrication techniques for antenna components, as they utilize antenna elements spaced less than a wavelength apart to realize Airy Beams. The systems disclosed herein therefore use antennas for RF wavelengths (including microwaves), which are more practical for fabrication.

In some implementations, a method includes configuring an antenna to transmit two or more coherent out-of-phase Gaussian beams along a propagation axis to generate a beam of electromagnetic energy. The beam is generated to propagate along the propagation axis, forms a focus along the propagation axis, and has an intensity along the propagation axis that is less than a highest intensity of the beam off the propagation axis.

One or more implementations of the method to transmit two or more coherent out-of-phase Gaussian beams along a propagation axis to generate a beam of electromagnetic energy can include the following optional features. For example, in some implementations, the two or more coherent out-of-phase Gaussian beams include a first Gaussian beam and a second Gaussian beam. The two or more coherent out-of-phase Gaussian beams are also transmitted co-axially along the propagation axis such that transmission of the first Gaussian beam and the second Gaussian produces an interference pattern forming a series of annular rings extending along the propagation axis.

In some implementations, the antenna includes at least thirty conductive elements.

In some implementations, the at least thirty conductive elements are configured to have a directivity attribute such that power transmission produced by the beam in a first direction corresponding to propagation of the beam is at least four times greater than power transmission in a second direction that is opposite to the first direction.

In some implementations, the at least thirty conductive elements are arranged around a radius of a central point along the propagation axis. Additionally, the focus is located in a first plane along the propagation axis that is not a second plane along the propagation axis in which the antenna is located. Moreover, an intensity and a phase in the second plane is based at least partially on the radius of the central point along the propagation axis.

In some implementations, the antenna is placed at a first location and configured such that the beam propagates in an abruptly autodefocusing fashion. Also, the beam transitions to an abruptly autofocusing beam at the equatorial plane of the beam to form the focus.

In some implementations, the intensity includes a measured intensity of the beam at a midway point between the focus and the antenna.

In some implementations, the method further includes configuring a second antenna that is placed at a second location at or near the additional focus of the beam along the propagation axis to receive a transmission associated with the beam.

In some implementations, the beam has a transmission wavelength $\lambda$. Additionally, the antenna is placed within $20\lambda$ of the additional focus along the propagation axis.

In some implementations, the antenna is placed in proximity to the focus at a distance equal to or less than the distance of ½ of an equatorial radius of the beam.

In some implementations, a frequency of the beam is less than 300 GHz.

In some implementations, the antenna includes an inner core that extends longitudinally in along the propagation axis. The antenna also includes a linear array of conductive elements surrounding the inner core, where each individual element included in the linear array of conductive elements is spaced apart at a distance along the propagation axis.

In some implementations, the beam has a transmission wavelength $\lambda$. Additionally, individual elements included in the linear array of conductive elements are spaced apart at a distance of approximately less than $\lambda/4$ along the propagation axis.

In some implementations, the beam has a transmission wavelength $\lambda$. Additionally, individual elements included in the linear array of conductive elements are spaced apart at a distance of approximately less than $\lambda/6$ along the propagation axis.

In some implementations, the beam has a transmission wavelength $\lambda$. Additionally, individual elements included in the linear array of conductive elements are spaced apart at a distance of approximately less than $\lambda/10$ along the propagation axis.

In some implementations, the linear array of conductive elements include a linear array of conductive rings that each have a first diameter. Additionally, the inner core has a second diameter, and the difference between first diameter and the second diameter is less than $\lambda/4$.

In some implementations, the antenna includes a mechanically steerable antenna.

In some implementations, the antenna includes an electronically steerable antenna.

In some implementations, the electronically steerable antenna has a spherical shape.

In some implementations, the electronically steerable antenna has a hemispherical shape.

In some implementations, the method further includes configuring a third antenna to transmit the beam. Additionally, the third antenna is configured to transmit the beam redundantly with the antenna such that an intensity of transmission of the beam received by the second antenna is increased.

In some implementations, configuring the second antenna includes configuring the second antenna to determine whether transmission of the beam satisfies a threshold. The configuration also includes configuring, based on determining that transmission of the beam satisfies the threshold, the second antenna to transmit a signal to the antenna.

In some implementations, the threshold includes a 1-watt wireless power threshold.

In some implementations, the antenna is configured such that the beam propagates along the propagation axis to exhibit a three-dimensional paraboloid shape.

In some implementations, transmission of the beam received by the second antenna includes a wireless power transmission signal.

In some implementations, transmission of the beam received by the second antenna includes a radar signal.

In another general aspect, a method includes configuring an antenna to receive a transmission associated with a beam of electromagnetic energy. The beam is generated based on two or more coherent out-of-phase Gaussian beams transmitted along a propagation axis. The beam is generated to propagate along the propagation axis, form a focus along the propagation axis, and has an intensity along the propagation axis that is less than a highest intensity of the beam off the propagation axis.

One or more implementations of the method to configure an antenna to receive a transmission associated with a beam of electromagnetic energy can include the following optional features. For example, in some implementations, configuring the antenna includes configuring the antenna to determine whether transmission of the beam satisfies a threshold. The configuration also includes configuring, based on determining that transmission of the beam satisfies the threshold, the antenna to transmit a signal to a transmitter associated with transmission of the beam.

In some implementations, transmission of the beam received by the antenna includes a wireless power transmission signal.

In some implementations, the two or more coherent out-of-phase Gaussian beams include a first Gaussian beam and a second Gaussian beam. Additionally, the first Gaussian beam and the second Gaussian are transmitted co-axially along the propagation axis such that transmission of the first Gaussian beam and the second Gaussian beam produces an interference pattern forming a series of annular rings extending along the propagation axis.

In some implementations, a frequency of the beam is less than 300 GHz.

In some implementations, the beam has a transmission wavelength $\lambda$. Additionally, the antenna is placed at a location at or near an additional focus of the beam along the propagation axis, and the antenna is also placed within $20\lambda$ of the additional focus along the propagation axis.

The details of one or more implementations are set forth in the accompanying drawings and the description below. Other potential features and advantages will become apparent from the description, the drawings, and the claims.

DESCRIPTION OF DRAWINGS

FIG. 3C illustrates an example of an abruptly autodefocusing (AADF) portion of an Airy Beam.

FIGS. 6A-E illustrate an example of a technique for constructing a spatial Fourier Transformation for a Whisper Beam.

FIG. 13 illustrates an example of a process for generating a Whisper Beam.

TERMINOLOGY

Below are descriptions of some of the terms used in the Detailed Description and in the Claims:

"Gaussian Beams" refer generally to beams in which transverse magnetic and electric field amplitude profiles are given by the Gaussian function. For example, a Gaussian Beam is a beam in which a peak electric field amplitude varies away from the center of the beam according to following the function:

$$e^{\frac{-x^2}{constant}}$$

where x is radius, in the case of an axisymmetric beam, or can be x and y in the case of an elliptical Gaussian beam, where the constant in that case may be different in the x and y directions. In some instances, Gaussian Beams can also be truncated (i.e., cut off to zero amplitude for $x>x_{max}$ (again, where x may be radius or where it may be the x and y direction), without altering their essential character as Gaussian Beams. Gaussian Beams, as described throughout this specification can also be slightly distorted, so long as they remain a smooth function, peaking in the center, without altering their essential character.

"Non-Gaussian Beams" refer to beams in which transverse magnetic and electric field amplitude profiles are not given by the Gaussian function. Additionally, or alternatively, a Non-Gaussian Beam can refer to any beam in which a peak electric field amplitude does not vary away from the center of the beam according to the function discussed above for Gaussian Beams.

"Whisper Beams" refer to a form of Non-Gaussian Beam. Whisper Beams form a diffuse core in which intensity at some point along a propagation axis between transmitter and the target focus region (such as, but not limited to, the midpoint between the transmitter and the focus area) is lower than intensity at some radius from that point. These beams sometimes mimic the quality of dispersing over a wide area and then recombining, analogous to a "whispering gallery". As described in greater detail below, Whisper Beams can be adopted for methods of power transfer, which can be generally be referred to as non-Gaussian power transfer. For example, a Whisper Beam can be the formed by transmitting two or more coherent out-of-phase Gaussian beams along a propagation axis. The transmission of the two or more Gaussian beams can enable the generation of a diffuse-core beam that has an intensity along the propagation axis that is less than a highest intensity of the beam off the propagation axis.

"Airy Beams" refer to a form of Whisper Beams that follow the Airy Function.

Figure 9:
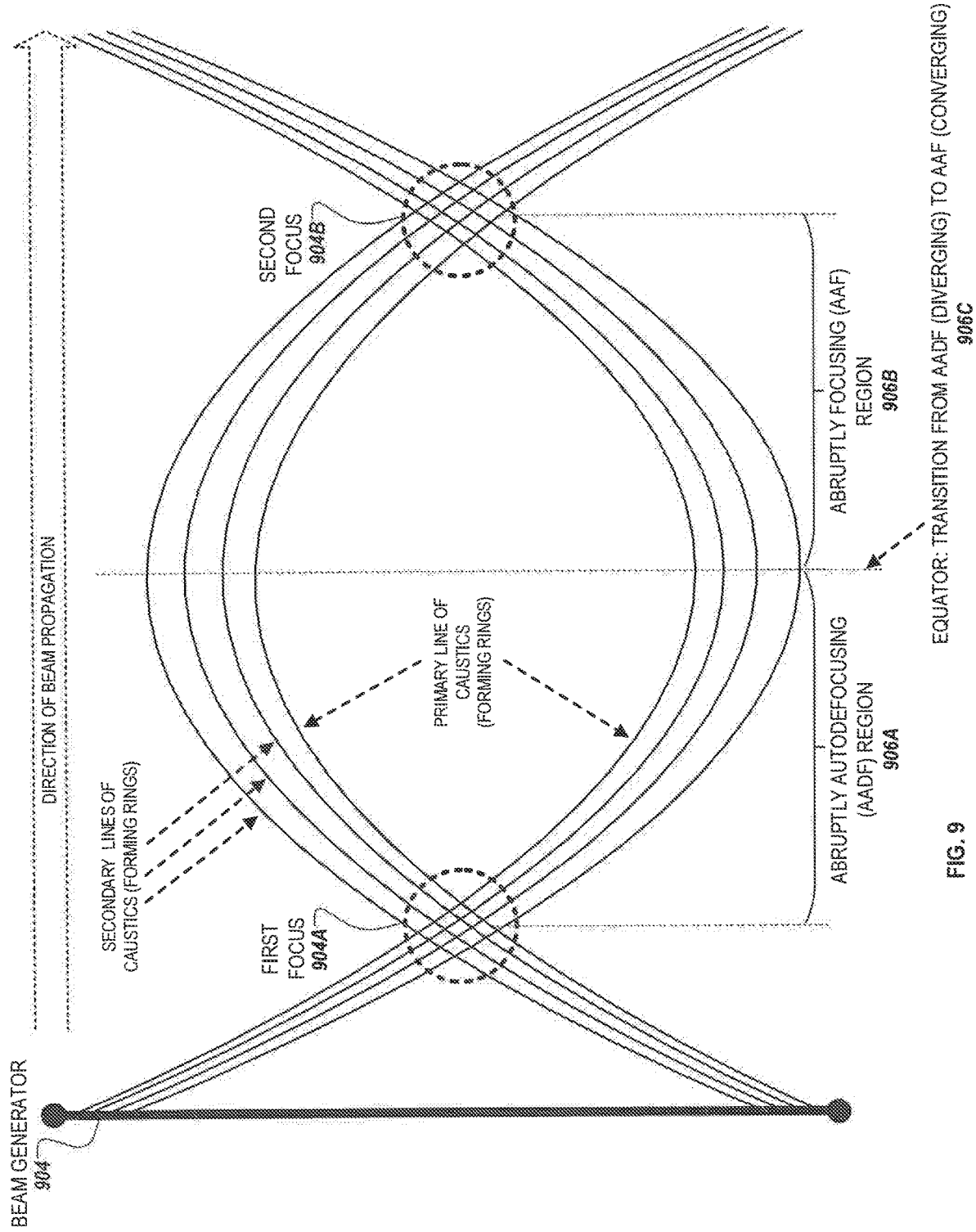
FIG. 9 illustrates an example of an RF Airy Beam that is generated and propagated for wireless power transmission using a broadside array antenna.

"Equator" of a Whisper Beam is a line formed around the circumference of the inner-most line of caustics of a Whisper Beam at its widest radius as shown in in FIG. 9 (e.g., plane 906C), sometimes referred to as the wide 'waist' of a bottle beam formed by an Airy Beam.

"λ" (pronounced lambda) refers to the wavelength of an electromagnetic wave.

"near" or "nearby", with respect to a focus of a Whisper Beam, refers to proximity to that focus at a distance that is no more than the lessor of: (i) 20 wavelengths of whatever frequency being transmitted, or (ii) one-half of the width of the Whisper Beam formed by the transmitter as measured at the equator.

"r" refers to the radius away from the center axis of a transmission.

"RF" or "radio frequency" refers to any frequency below 300 GHz.

DETAILED DESCRIPTION

This disclosure describes techniques and systems for generating and using Whisper Beams for wireless long-distance power transmission. In some implementations, Whisper Beams can be made using radio frequencies (RF), such as for long-range wireless power transmission. The systems can include a transmitting antenna, and a receiving antenna placed at or nearby a focus of the Whisper Beam. The systems can utilize the parabolic path and self-healing properties of Whisper Beams to permit the receiving antenna to receive power even when a transmission path with the transmitting antenna is partially obstructed. The claimed techniques may be employed in other use cases, applications, and configurations in addition to wireless power transmission. Thus, while the present application describes implementations where power is supplied to, for example, electric vehicles, the method could be used whenever it is desirable to focus electromagnetic energy in a limited three-dimensional volume Additionally, various types of Whisper Beams are contemplated to be used with the systems and techniques disclosed herein. As one example, Airy Beams are a type of Whisper Beam that have been formed at optical wavelengths for bringing light to a first focus, dispersing the beam in an abruptly autodefocusing (AADF) pattern that transitions to an abruptly autofocusing (AAF) pattern to form a second focus. Other types of Whisper Beams can also be employed in enabling long-range wireless power transmission.

A. Overview of the Electric Vehicle Environment

An overview of electric vehicles is described to provide context for implementations of the present disclosure, and as introduced above. By way of illustration, battery-electric flight vehicles, such as aircraft may be perceived to have limited flight range compared to flight vehicles powered by petroleum or other fossil fuels, or by hydrogen. This limited range may severely limit the use of electric aircraft. Charge time can also limited battery-electric flight vehicles, requiring either the flight vehicle to remain on ground during charging or to swap out (replace) batteries prior to flight. Additionally, an aircraft with no access to external power often relies entirely on its on-board energy storage for flight. For example, a battery electric aircraft that runs low on energy must land (sometimes declaring an emergency to clear other air traffic).

In contrast, a flight vehicle that can charge while in flight can continue flying until a suitable landing window slot is assigned. This type of flight vehicle can also draw external power as a dissimilar redundant power source during critical phases of flight, including takeoff, climb, and landing, thereby enhancing the safety of aircraft operations. All-electric UAVs and space-launch vehicles can also draw power while carrying payloads to increase carrying capacity and extend range.

Similarly, ocean-going container ships often burn large quantities of diesel fuel while maneuvering in and/or around port facilities, generating exhaust and particulate. Port facilities are also often located in urban areas. The diesel emissions can reduce air quality in these urban areas. By drawing external power while maneuvering in and around port, the ships can with zero emissions in all-electric mode. Smaller ships, such as ferries, tug boats and other harbor craft, can also draw external power to run all-electric while in and around ports.

Electric road vehicles may also be perceived to have limited driving range compared to petroleum cars and trucks. This limited range may force the owner to repeatedly stop-and-charge, causing a condition among potential consumers known in the automobile industry as range anxiety. In another challenge, electrical vehicles have batteries with long charge times, for example, including charge times that can vary between ½ hour to several hours when the electrical vehicles are stopped. These limitations can be even more problematic for electric flight vehicles.

Figure 1:
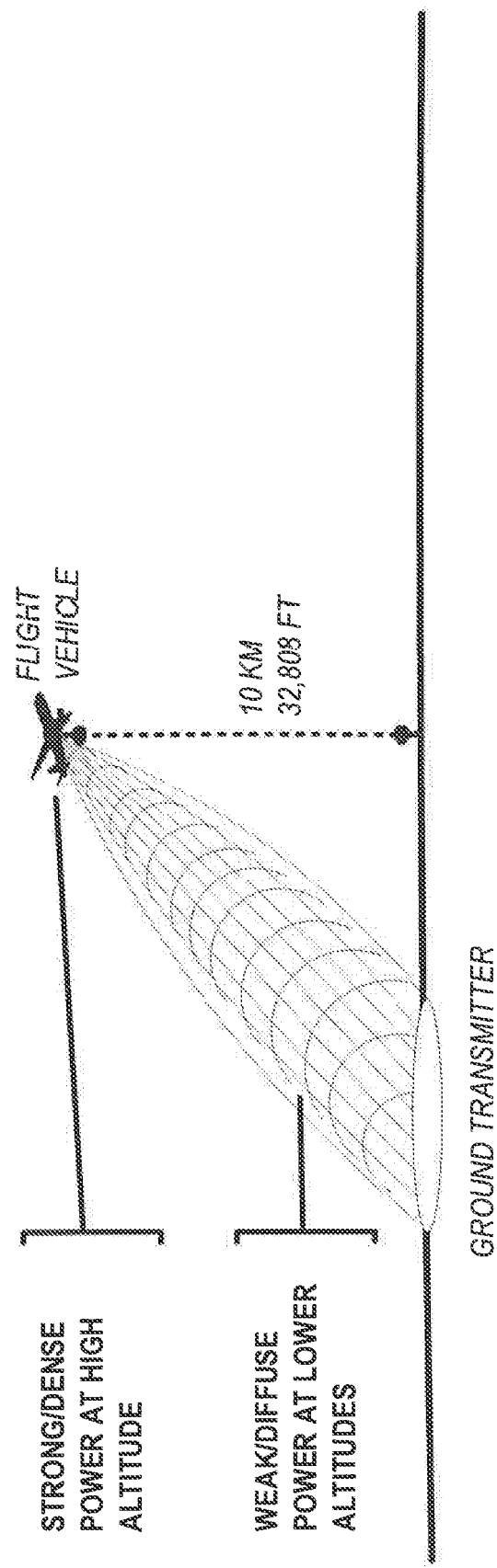
FIG. 1 illustrates the invention powering an aircraft while in flight
Figure 2A:
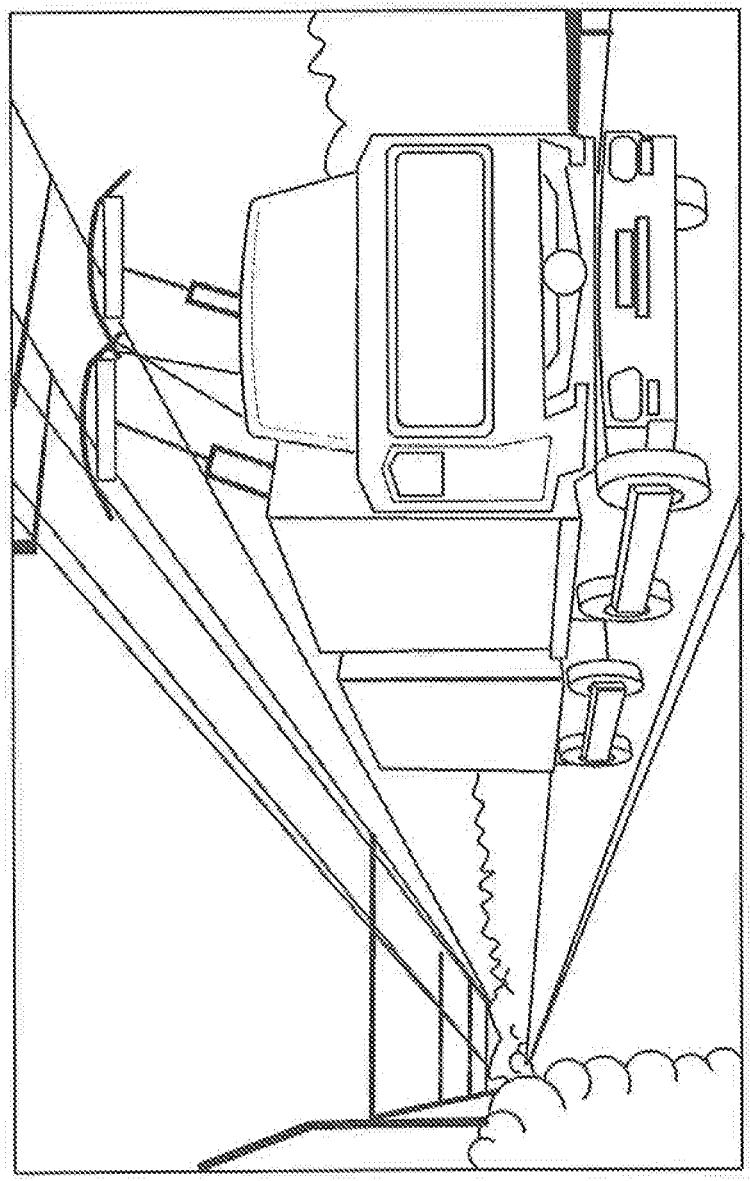
FIGS. 2A and 2B illustrates examples of experiments to power moving vehicles.

Numerous attempts to improving electric vehicles have been made, but with limited success. Batteries can store power, but have limited storage capacity, add weight to the vehicle, add cost to the vehicle, and battery disposal can burden the environment. Supplying external power to vehicles using contact devices is impractical for flight vehicles, and for other vehicles can be costly and require prohibitive infrastructure investments. In one illustration, trucks were configured with a special pantograph rack to make contact with power lines strung over highway lanes, as shown in FIG. 2A. In this illustration, the special rack on the trucks can maintain contact (and associated friction) with the overhead power lines as the truck moves. Such solution allows the moving track to draw power only when in the immediate contact of power lines, thereby limiting the usage.

Figure 2B:
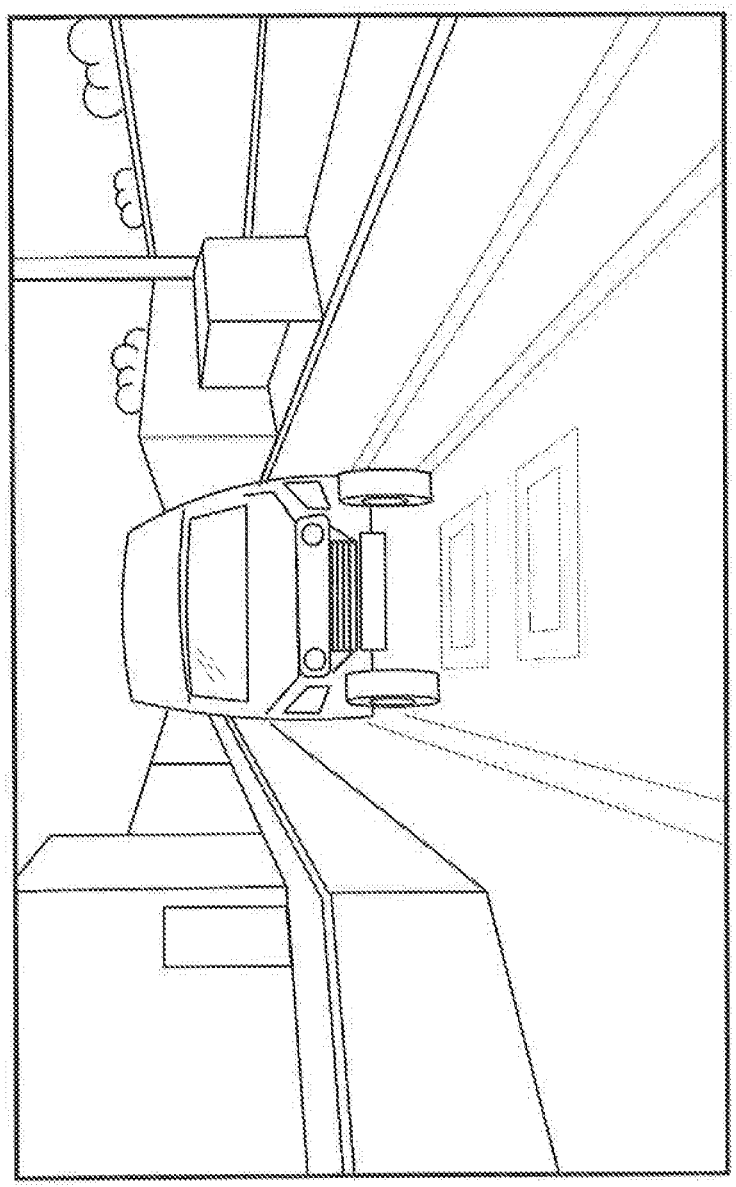

Vehicles may be powered using near-field resonant inductive coupling of two sets of inductive coils. As shown in FIG. 2B, a first set of inductive coils are embedded in a patch of a highway segment. The first set of inductive coils serve as transmitting coils to supply low power electricity to receiving coils mounted at the bottom of a car travelling over this segment. The receiving coil resonates at the same frequency as the transmitting (primary) coil. The receiving coil on a vehicle is known as the secondary inductive coil. In this illustration, the first set of inductive coils are embedded in roadways. In this configuration, the range of effective transmission, depending on antenna configuration and resonant frequency, is limited to just a few centimeters requiring the car's antenna to be mounted close to the road, reducing vehicle ground clearance. The vehicle must maintain acceptable alignment with the transmission coils while moving over the patch of the roadway. Any misalignment can further reduce efficiency, thereby decreasing the received power.

Wireless power transfer may be further limited by constraints on antenna technology. Inductive coil-based systems may struggle with three challenges. First, coils may be limited to short wavelengths. Coils may operate in the reactive near field, for example, approximately 0.159 of the wavelength, to provide wireless energy. The shorter the wavelength, the smaller the region of the reactive near field, and so the closer the vehicle must be to the transmitter.

Second, coils may cancel out or limit their own magnetic field. At short distances less than the diameter of the coil (which, in some configurations is often a distance of only a few centimeters), the magnetic field falls off merely with the inverse of distance. However, charge on opposite sides of the loop flows in opposite directions, which creates opposing magnetic fields. This, in turn, may cancel or reduce the magnetic field and coupling between remote systems at appreciable distances greater than a coil diameter. At distances away from the coil that are greater than one coil diameter, the magnetic field strength falls off quickly, at approximately the inverse cube of distance ($1/r^3$).

The above two factors detrimentally limit effective transmission proximate to the transmitter. A third challenge with coil technology is that transmission range is at its maximum when the receiver coil is symmetrical with the transmitter coil. In the case of vehicular power systems, the receiver size is limited by on-board packaging constraints. The transmitter size is thus limited to maintain symmetry with the receiver. As a result, it is sometimes difficult to make the transmitter large and powerful enough for the vehicle or device, or to allow for movement or misalignment between the transmitter and receiver.

As a result, inductive wireless charging can be difficult or impractical for portable electronic devices and road vehicles, and can be infeasible for vehicles in flight.

B. Overview of Beam Generation Techniques

1. Gaussian Beams

Typical far field electromagnetic radiation extends in many (sometimes spherically in all) directions, and so beam strength falls off rapidly with distance. Focusing energy can culminate the beam in one direction but, due to diffraction of the waves, beam strength dissipates with distance.

2. Whisper Beams

Whisper Beams both have diffuse cores, where part or all of the center axis of transmission (or propagation axis) between transmitter and focus region has a low electromagnetic field level relative to concentric co-axial rings surrounding the center axis. The concentric rings are of alternating phase (an example of which is shown in FIG. 3A).

Figure 3A:
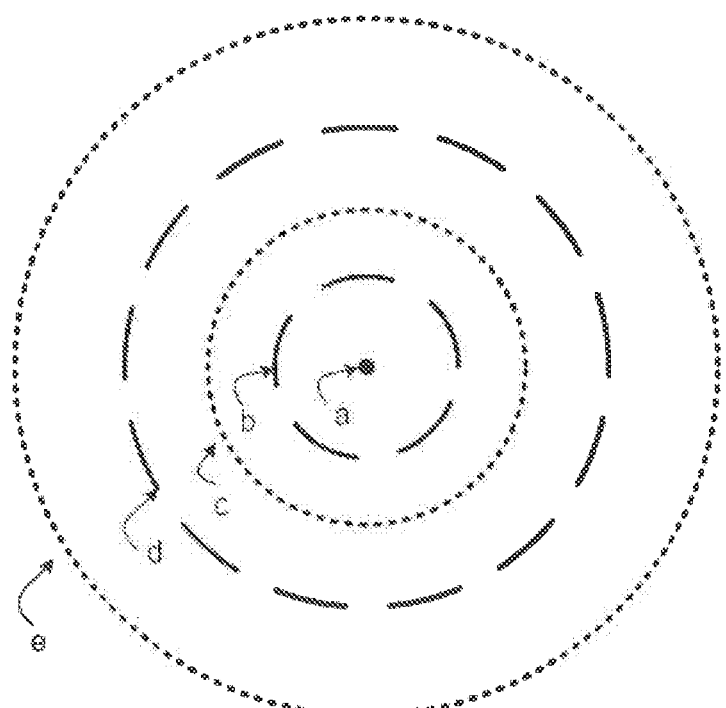
FIG. 3A illustrates an example of concentric rings formed around a beam axis in a Whisper Beam.

As shown in FIG. 3A, concentric rings "b," "c," "d," and "e" are formed around beam axis centerline "a" in a Whisper Beam (with a center axis of beam coming out of the page). Rings "b" and "d" are in-phase (these rings are depicted as dashed line, to illustrate two continuous rings of the same phase). Rings "c" and "e" are in the opposite phase (these rings are depicted as dotted line, to illustrate two continuous rings both of opposite phase to rings "b" and "d"). The electromagnetic field levels along the center axis "a" are lower than the electromagnetic field levels in the rings.

3. Airy beams

Figure 3B:
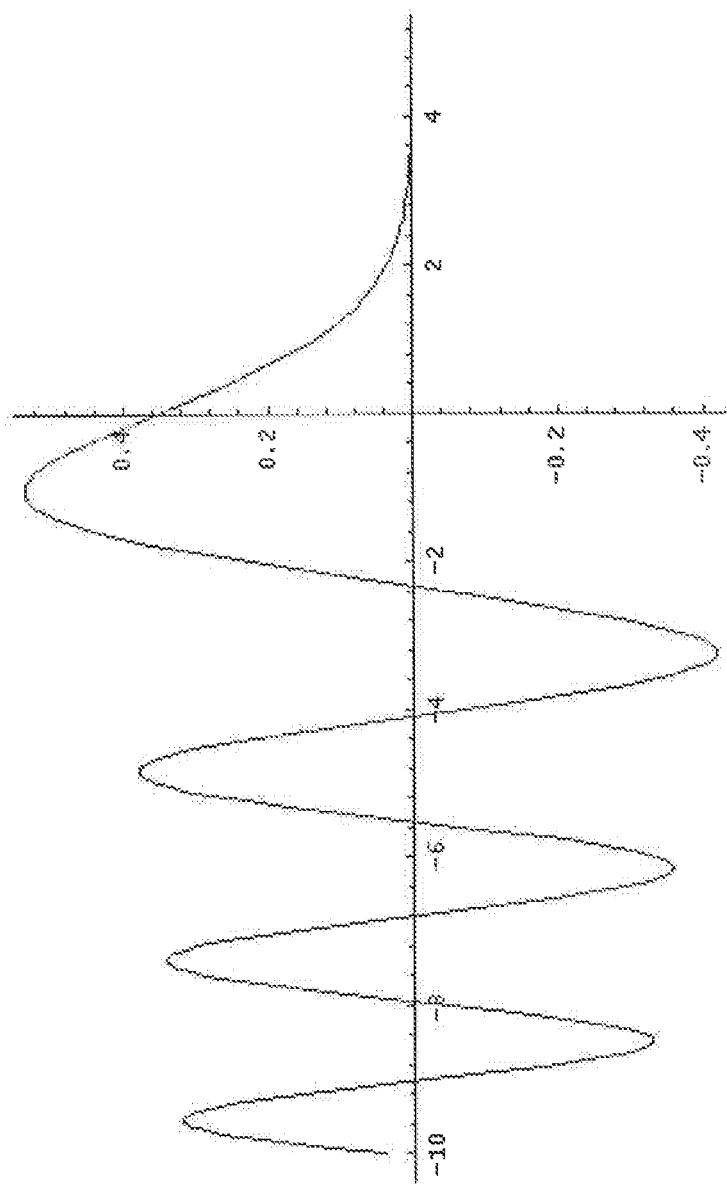
FIG. 3B illustrates an example of an Airy Function.

An "Airy Beam" is an example of a diffuse-core Whisper Beam that can be derived from an Airy function (an example of which is shown in FIG. 3B). Airy beams are sometimes used in optics framework (i.e., visible light) and can exhibit two characteristics: (1) they remain approximately diffraction-free, while (2) their intensity features tend to transversely accelerate (i.e., self-bend) during propagation even in the absence of an external influence.

An optical Airy Beam, as a two-dimensional plane, can be made to accelerate such that the center of beam does not follow a straight line. For example, an Airy Beam can be constructed using optical wavelengths to form caustics into two-dimensional parabolic lines or three-dimensional paraboloid shapes. In this example, the optical wave structure follows distribution of the Airy function by exponentially tapering to zero at its center and, at a certain radius, the wave looks like a damped sinusoid, with each successive peak and valley a little smaller. These optical waves interfere with each other in such a way that, qualitatively, they form a center that is empty (or nearly so) of waves. Lateral gradients cause the beam to evolve with propagation through space in a controlled manner determined by the Airy function. Thus, Airy Beams do not experience the same diffraction losses over distance, and so are sometimes described as "pseudo non-diffracting" beams.

Airy Beams can be "self-healing," which often refers to the ability of an optical beam to reform downrange of perturbation by some interference. Reformation may not be at the original strength, but tends to be a coherent reforming of the unperturbed portions of the beam.

a. Abruptly Autodefocusing (AADF) Beams

In some instances, optical laser light can be used to form a circularly symmetric beam with an Airy profile that are abruptly autodefocusing (AADF), which passes through a focal point and then spreads itself out to a large circular Airy beam with a diffuse core. FIG. 3C displays an AADF Beam. As shown in FIG. 3C, Airy rings converge near the first focus 304A. The amplitude and phase distribution in the immediate neighborhood of the first focus 304A is complex but can be numerically simulated using the paraxial diffraction equations from an initially-specified phase and amplitude distribution.

b. Abruptly Autofocusing (AAF) Beams

In some instances, optical laser light can be used to form circularly symmetric beams with an Airy profile, which is sometimes referred to as circular Airy Beams (CAB) that are abruptly autofocusing (AAF). The maximum intensity of a radial wave remains almost constant during propagation, but its intensity suddenly increases by three or four orders of magnitude right before its focal point. Lasers can be used to form AAF Beams and used for observation. A Fourier Transform (FT) of a radially symmetric Airy distribution can be encoded onto a phase filter, which is applied onto a phase-only reflecting spatial light modulator (SLM) screen. The phase modulation capability of this device can be up to ~$2\pi$ and phase wrapping can be used to implement higher phase modulation. The phase modulated reflected wave front can then be Fourier transformed by a lens (for example, $f_L$=500 mm). An opaque mask is used to block the undesired zero-order peak.

A laser system can also be used to form an Airy wave with an intensity contrast, which is defined as the ratio of the peak intensity along the propagation to the peak intensity at the Fourier Plane $$\frac{I(z)}{I(0)}.$$

The intensity peak follows a curved trajectory as the wave propagates toward the focus. The intensity contrast is abruptly increased at the focus. The autofocusing is an inherent property of the wave. For example, an Airy ring can be generated from the FT plane of the lens, and define an effective focal distance $f_{Ai}$ as the distance between (i) the plane of generation of the Airy ring, and (ii) the focus position. In some instances, the $f_{Ai}$ is approximately 380 mm. This distance can be controlled by the initial size of the primary Airy ring and the width of the Airy intensity lobes.

Precisely following the Airy function may not be required to form an AAF Beam, and the shape of the AAF Beam need not be a paraboloid. Instead, the Airy function can be distorted to obtain a slightly different shape that still follows a power-law curve in which the exponent is not exactly equal to 2. However, this technique provides disadvantages, such as degrading the sharpness of beam focus, degrading the diffraction-free property of the beam, degrading self-healing properties of the beam, additively or alternatively.

In some instances, optical beams can be accelerated sideways (i.e., curved) downrange vertically (i.e., y-axis) of a transmitter device, which generates a circularly symmetric input profile that develops outward of a dark disk and oscillates radially as a sublinear-chirp signal. This configuration creates a series of concentric intensity rings with gradually decreasing width. The laser light involved in this process can form a caustic surface of revolution that bends toward the beam axis at an acceleration rate that is determined by the radial chirp. The collapse of the caustic on the axis can lead to a large intensity buildup right before the intended focus. Because of the inward, diffraction-resisting radial acceleration of the Airy wave function, the intensity rings of the generated beam contract towards the axis with minimum shape distortion, keeping the maximum intensity constant along the entire path between source and focus. The main (inner) intensity ring writes a paraboloid caustic surface of revolution in space that collapses on-axis at a point of maximum amplitude gradient, right before the intended focus.

In some instances, radio-frequency (RF) waves may also be formed into AAF circular Airy Beams as discussed above. For example, a broadside antenna can be used to create the CAB such that rays propagate at a 90° angle from antenna components. As described herein, RF CABs can be used in wireless communications or remote sensing applications to deliver power within tightly focused beams at a Fresnel range. These techniques can sometimes involve challenges, such as extension to 3D radiation from dipole arrays, efficient design under mutual inter-element coupling, simultaneous optimization of the far-field pattern, and the extreme beam bending at non-paraxial angles.

c. Optical Bottles

In some instances, optical laser light can be used to form AADF Beams that transition to AAF Beams to form "optical bottles," which refers to a property that can be used to form a family of beams that have two foci, which are sometimes called Janus Beams. A generated beam first forms an AADF region. The AADF region then forms an AAF region. AADF/AAF circular Airy Beams forming two foci can be used to form two closed ends of an "optical bottle" for guiding and trapping nano-sized or micro-sized particles.

In an exemplary configuration, optical rays are emitted from a source transmitter though a Fourier-Transform lens with a focal length f such that z=f. The parabolic shape is generated by what is sometimes referred to as a "weak chirp" type of optical beam that includes a set Airy rings which, by virtue of a lens used to generate the beams, tend to converge at a first focus downrange from a beam generation point. Optical rays pass through the lens a distance f on the other side of the lens to form a focus point of caustic points (at z=2f). The caustics radially diverge forming an "optical bottle" shape with a middle portion or "equator" representing a maximum distance of a line of caustic points. The line of caustics re-converges at a second focus point. These "optical bottles" can be formed by superimposing two beams in a Bessel-like standing wave pattern to create a complete caustic surface of revolution that is mirror-symmetric with respect to the focal plane.

d. Steering and Shaping

The phase on the input plane of a system can be used to design optical beams with predefined trajectory or beam width, thereby "steering" the beam's focus. A Fourier Transform method can be used to enhance the control of the size and range of the optical beams produced through a focal length of a lens, which produces perfectly-symmetric optical bottles and arbitrary convex caustics at distance z downrange of the lens.

The relative size of the x and y axis of the beam can be altered to form elliptical patterns, to impart a vortex on the elliptical Airy Beam. With optical light, one can (i) alter the eccentricity of the shape formed by the line of caustics (that is, the ratio of the long axis and the equator), and (ii) control the direction of the long axis, such that the beam's line of caustics can 'twist' or 'rotate' as it propagates outward.

C. Whisper Beam Power Transmission

Systems and techniques are generally disclosed herein for generating Whisper Beams using electromagnetic waves for wireless power transmission between a transmitter and a receiver. In some implementations, a Whisper Beam is generated as diffuse-core beams by transmitting two or more coherent out-of-phase Gaussian Beams along a propagation axis such the Whisper Beam has an intensity along the propagation axis that is less than a highest intensity of the beam off the propagation axis.

In other implementations, a system is configured such that a transmitting antenna generates an Airy Beam. In such implementations, the transmitter is placed at or nearby a first focus of the Airy Beam, and a receiving antenna is placed at or nearby a second focus of the Airy Beam that is downrange from the beam generation point relative to the first focus. Airy Beams are just one example of a class of Whisper Beams in which the electromagnetic field levels along the co-axial rings are higher than the center axis. Other diffuse-core beams do not follow the Airy function.

1. Wireless Power Transmission using Whisper Beams

Figure 4A:
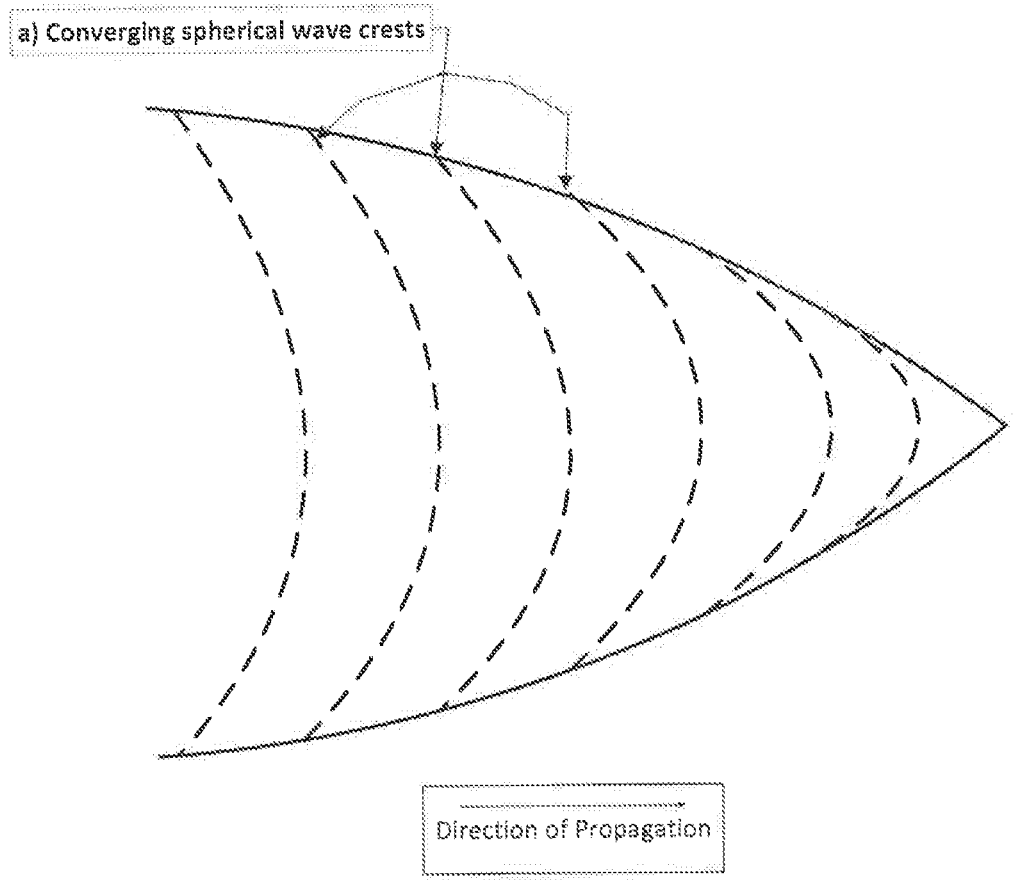
FIGS. 4A-D illustrate an example of a technique for forming a Whisper Beam as a diffuse-core beam using two coherent out-of-phase co-axial Gaussian beams.
Figure 4B:
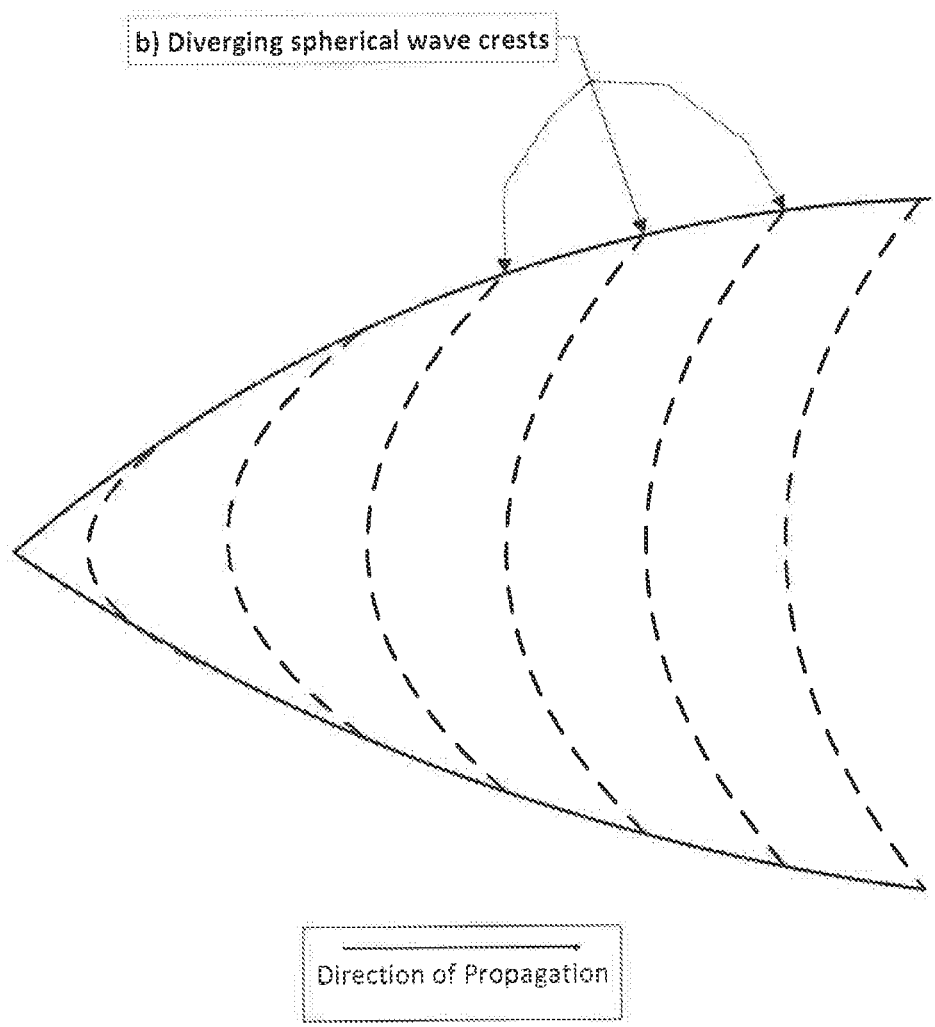
Figure 4C:
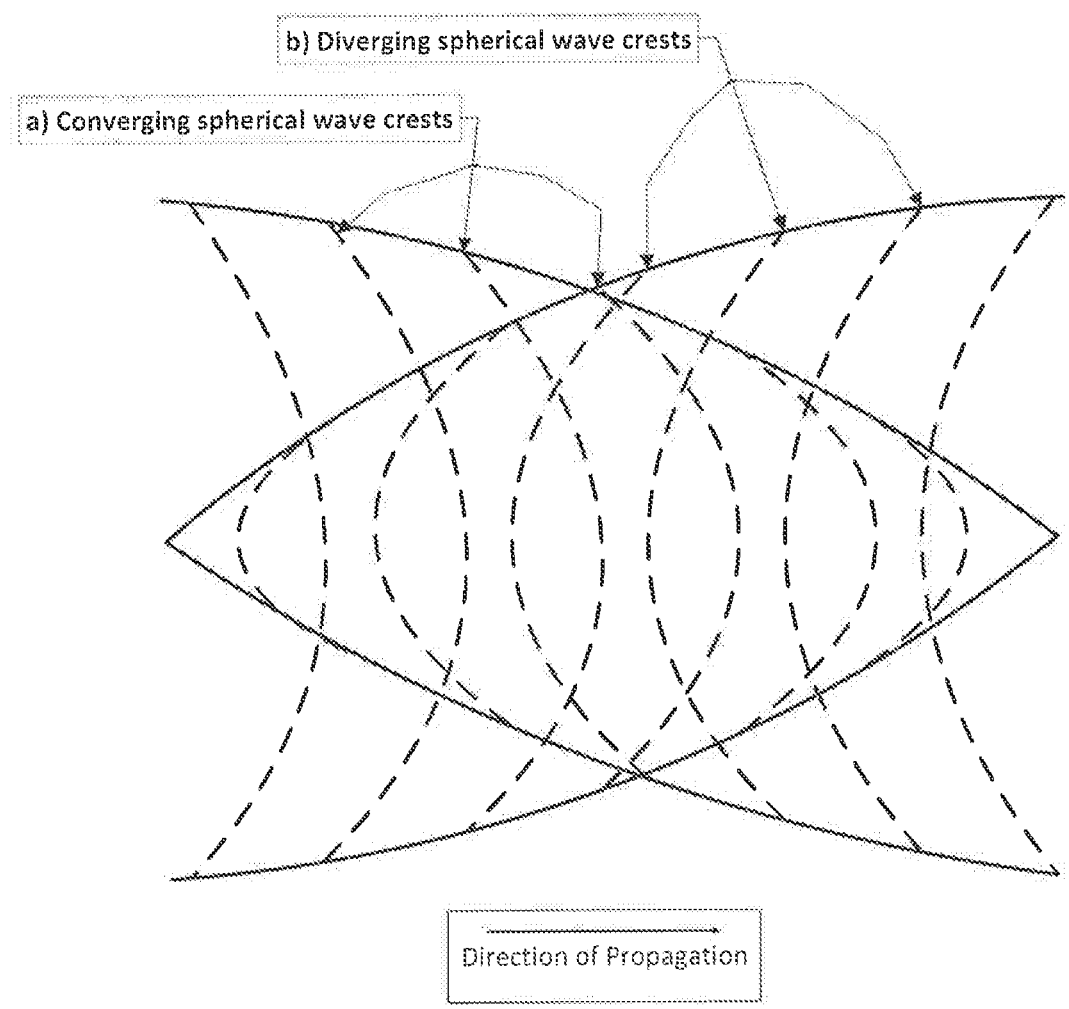

FIGS. 4A-D illustrate an example of a technique for forming a diffuse-core beam using two co-axial Gaussian beams. FIG. 4A illustrates an example of a first Gaussian Beam in the form of a converging Gaussian Beam with converging spherical wave crests. In contrast, FIG. 4B illustrates an example of a second Gaussian Beam in the form of a diverging Gaussian Beam with diverging spherical wave crests. The first Gaussian Beam and the second Gaussian Beam can be transmitted in the same axis to form a Non-Gaussian Beam (as shown in FIG. 4C).

Figure 4D:
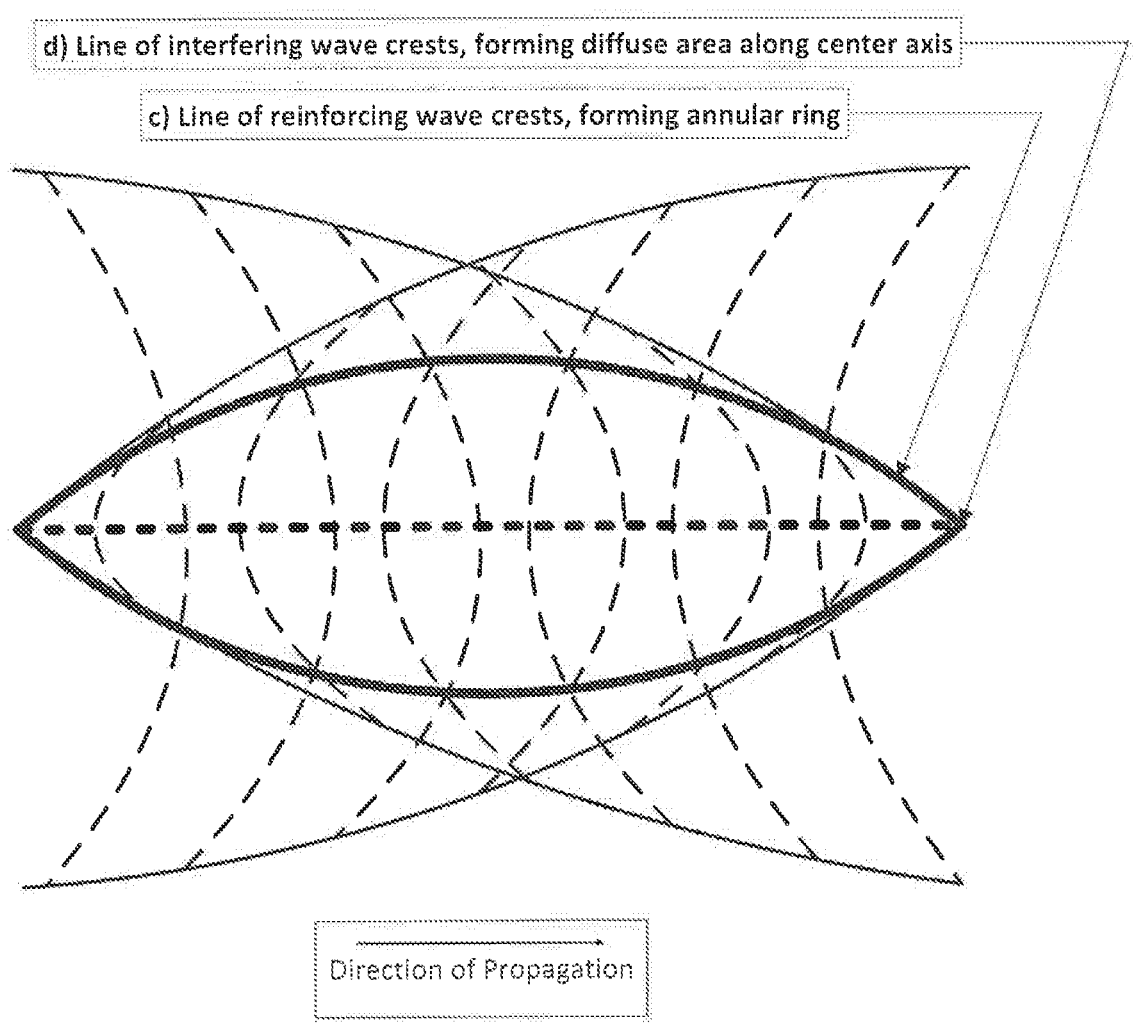

Two co-axial Gaussian Beams (i.e., two Gaussian Beams transmitted in the same axis) form an interference pattern (as shown in FIG. 4D). Caustics are formed in areas where waves of the two beams reinforce each other, resulting in a local maxima of intensity. Because the two Gaussian Beams are co-axial, the caustics form a series of annular rings that extend along the axis (illustrated in FIG. 8). As shown in "(c)" in FIG. 4D, interference pattern forms annual rings of caustics where the converging waves reinforce the diverging waves. Annular ring forms an ogive shape. Though only one ring is illustrated in FIG. 4D for simplicity, a series of concentric rings of alternating phase are actually formed. The inner rings are at first abruptly autodefocusing (AADF), then reach the equator, and then are abruptly autofocusing (AAF).

Additionally, as shown in "(d)" in FIG. 4D, concentric rings of varying phases tend to cancel each other out along the center axis. This creates a null or "dark" zone and a diffuse (or hollow) center along the central axis, which is characteristic of Whisper Beams.

As discussed herein, technologically, a challenge in practicing economical long-distance power transfer is forming the Whisper Beams at suitable frequencies. Techniques in the optical domain using holographs and lenses are often unsuitable or sub-optimum for RF. Broadly speaking, RF requires a multiplicity of emitters arranged in a defined configuration, with controlled phase and amplitude to make desired amplitude and phase pattern at the transmission plane to synthesize the desired diffuse core beam.

Figure 6B:
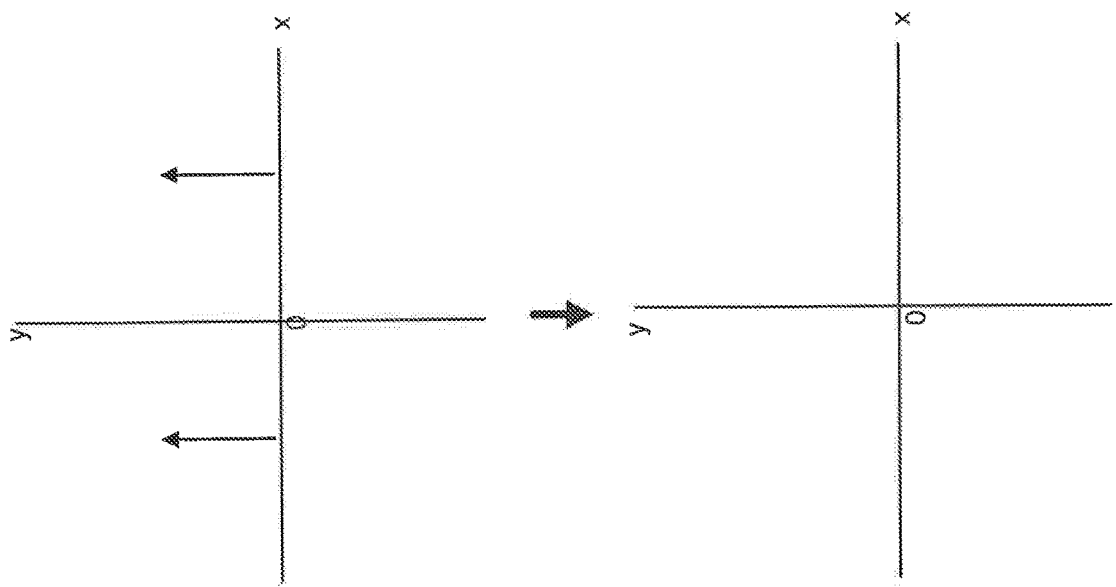

Whisper Beams generated using the technique illustrated in FIGS. 4A-D can provide various advantages. For example, a beam generated in this fashion can economically focus power at distances previously thought impractical or impossible. As shown in FIG. 6B, a computer model of a Whisper beam can focus power at 0.5 km, at 125 km, and at 740 km. The beam enables power focusing at longer range with relatively low electromagnetic field levels before and after the focus region. As a result, a substantial portion (e.g., approximately 50%) of the power converges into the downrange focus area and the other approximately 50% is scattered away from the focus area. The result is that high power levels (e.g., a few watts to megawatts) can be focused at long range. As another example, power produced by a beam remains diffuse in much of the area between the transmitter and focus region. For instance, even if megawatts of power are harvested by a receiver in the focus area, there is far less concentration of power in the region prior to the focus area. The beam would have less effect on wildlife and unintended aircraft that may inadvertently wander into the beam.

a. Transmitter Placement

Figure 5:
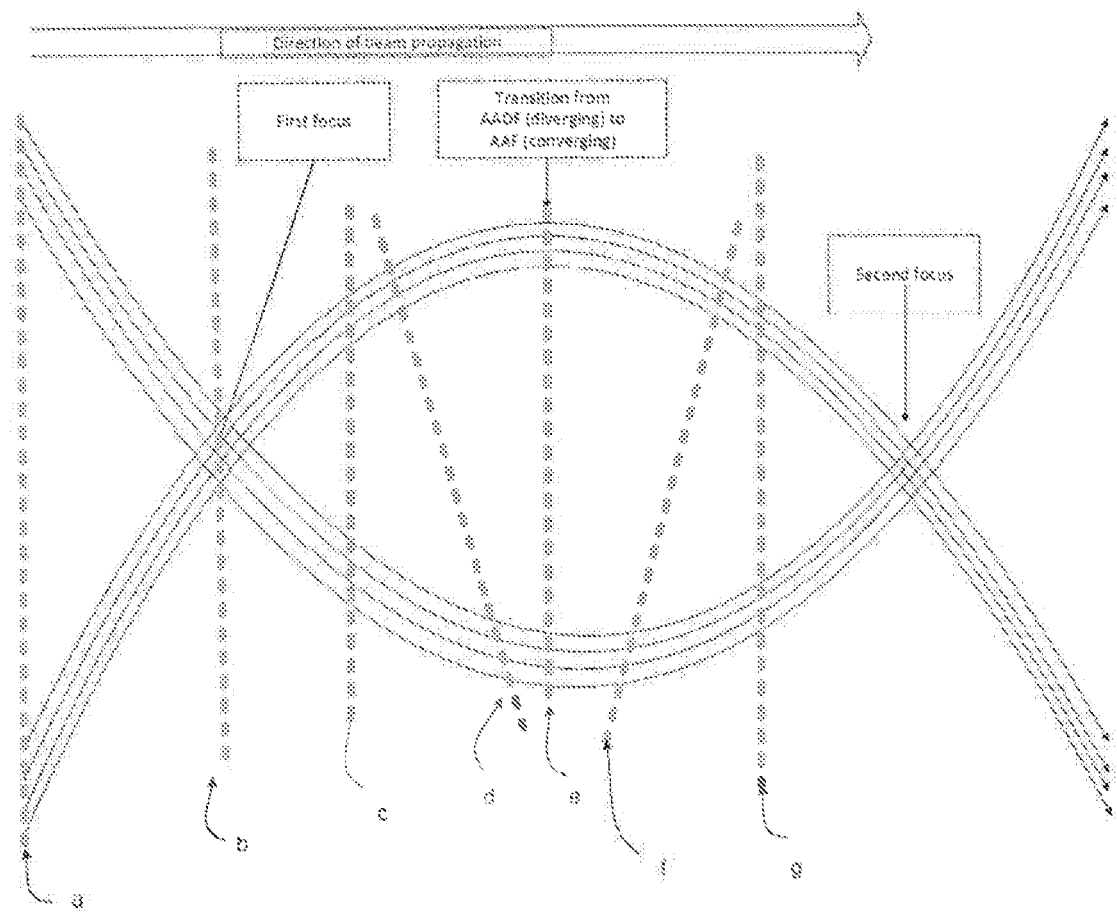
FIG. 5 illustrates an example of a Whisper Beam that is formed by placing a transmitter at any plane along a transmission axis.

A Whisper Beam can be formed by placing a transmitter at any plane intersecting the center axis of the beam. FIG. 5 illustrates seven representative examples of transmitter placement at any plane along a transmission axis. The transmitter placements include a placement prior to a first focus ("a") and a placement at the first focus ("b"). Additional examples include placements in the diverging portion of the Whisper Beam, between the first focus and the equator, and a placement perpendicular to the beam's center axis ("c"), and placements in the diverging portion of the beam, between the first focus and the equator, and other than perpendicular to the beam's center axis ("d"). Other examples include a placement at the equator where the caustics begin to converge ("e"), and placements in the converging portion, between the equator and the second focus, other than perpendicular to the beam's axis, and/or in the converging portion between the equator and the second focus, perpendicular to the beam's axis ("g"). The underlying transmission path is discussed in greater detail with respect to FIG. 9.

Specific placement of the transmitter can often be varied in different implementations based on the objectives of the beam application. For example, if the application is to power UAVs during takeoff and landing, a transmission array might be placed in rings around a takeoff and landing pad, in which case the Whisper Beam might be formed at its equator (e.g., as illustrated in FIG. 5 with "e"). Placement at other locations can facilitate formation of a conically shaped beam (e.g., as illustrated in FIG. 5 with "f"). As shown in FIG. 5, the transmitter can be placed in any plane of the intended beam and need not necessarily be placed at the first focus.

b. Transmitter Arrays

In some instances, transmitter arrays can be used to generate Whisper Beams. The array can be composed of numerous individual transmission elements (for example, as shown in FIG. 10B). The level of power transmitted can be varied by increasing (i) the number of individual transmission elements, and/or (ii) the power transmitted by each individual element. For example, in one implementation, individual transmitters are modular in construction, and can be substituted with one another and transmit pulses.

By coordinating the timing of each transmitter to form an interference pattern, the overall array can produce a Whisper Beam. Each transmitter's individual pulses can be timed to accomplish various objectives, such as altering the width of the equator, raising or lowering the electromagnetic field levels in the region between the transmission array and the second focus, moving the focus region in three-dimensional space (e.g., to track a receiver mounted to a moving aircraft, changing the size of the focus area, among others). In some instances, less than 100% of power is concentrated in the focus region. In such instances, the receiving antenna (rectenna) can be made bigger to capture a higher percentage of transmitted power, and smaller to capture a smaller percentage of transmitted power.

c. Aperture

Conceptually, a transmitting array for a Whisper Beam should form both a converging Gaussian Beam and a diverging Gaussian Beam (as discussed in reference to FIGS. 4A-D). For example, in some instances, a single transmitting array can form both beams. The required aperture can be determined by the selected transmission plane. In general, the converging beam's minimum aperture is largest when its transmitting array is placed prior to the first focus (as shown in "a" in FIG. 5). The converging beam's minimum aperture then gets smaller the closer the array is placed to the second focus. The diverging beam's transmitting aperture is the opposite, being smallest when placed at the first focus and getting larger the closer it is placed to the second focus. The two apertures are of equal size at the equator, which is also the smallest "combined" array. As a result, the array size is driven by the converging beam when the array is placed prior to the equator and is driven by the diverging beam when the array is placed after the equator.

As shown in FIG. 5, the transmitting array is relatively large at "a" and reduces in size the closer it is placed to the equator. For example, the relative sizes of transmitting array at "b," "c" and "e" are reduced as the converging aperture is reduced. After the equator (e.g., "e" in FIG. 5), the transmitting array again begins to expand as the diverging aperture increases.

d. Axisymmetric Arrays

In some instances, a Whisper Beam can be propagated from a two-dimensional axisymmetric array. Various numbers of individual array elements (e.g., from hundreds to millions) can be employed depending on the power level and range sought.

This type of configuration provides various types of advantages, for example, by enabling power focusing at longer range and enabling relatively low electromagnetic field levels before and after the focus region. As a result, a substantial portion (e.g., approximately 50%) of the power converges into the downrange focus area and the other approximately 50% is scattered away from the focus area. The result is that high power levels (e.g., a few watts to megawatts) can be focused at long range.

Another benefit of this technique is that power remains diffuse in much of the area between the transmitter and focus region. For instance, even if megawatts of power are harvested by a receiver in the focus area, there is far less concentration of power in the region prior to the focus area. The beam would have less effect on wildlife and unintended aircraft that may inadvertently wander into the beam.

In some implementations, the axisymmetric array may be elliptical in shape. This may be useful when the array is intended to transmit at an angle (that is, to a receiver not directly above the transmitter). For example, from the perspective of such a vehicle, the array may appear as a circle. In other implementations, the array can be other shapes, such as a square or rectangle. The transmitter can be shaped in various configurations to suit a particular application.

e. Sparse Arrays

In some instances, transmitter range can be increased by increasing transmitter aperture size. For example, it may be physically possible to increase the number of transmitter elements asymmetrically to create a larger aperture. However, this technique also introduces cost associated with the array given the increased number of transmission elements.

To address this challenge, in some implementations, the arrangement of the transmission modules can be placed at irregular intervals, leaving some gaps so that the configuration creates a "sparse" array instead of an axisymmetric array.

A sparse array can achieve an effectively wider aperture while minimizing the number of transmission elements. For example, a sparse array can be used to focus power further than distances between approximately 0.5 km to 1 km. A sparse array can be configured in a wide variety of ways to propagate Gaussian Beams and optimized based on a particular power transfer application.

FIGS. 6A-E illustrates an example of a technique that can be used to design sparse arrays for propagating Whisper Beams. In general, a sparse transmitting array can be designed based on desired characteristics of an associated receiver. For example, the pattern at the receiver (i.e., the "image plane" in optics terminology) is the spatial Fourier Transform of the pattern at the transmitter (i.e., the "source plane" in optics terminology). A paraxial relationship between the two can be assumed such that a Gaussian Beam is relatively easy to analyze, since the spatial Fourier Transform of a Gaussian Beam is a Gaussian distribution. For a Non-Gaussian Beam, the spatial Fourier Transform is often Gaussian.

Figure 6A:
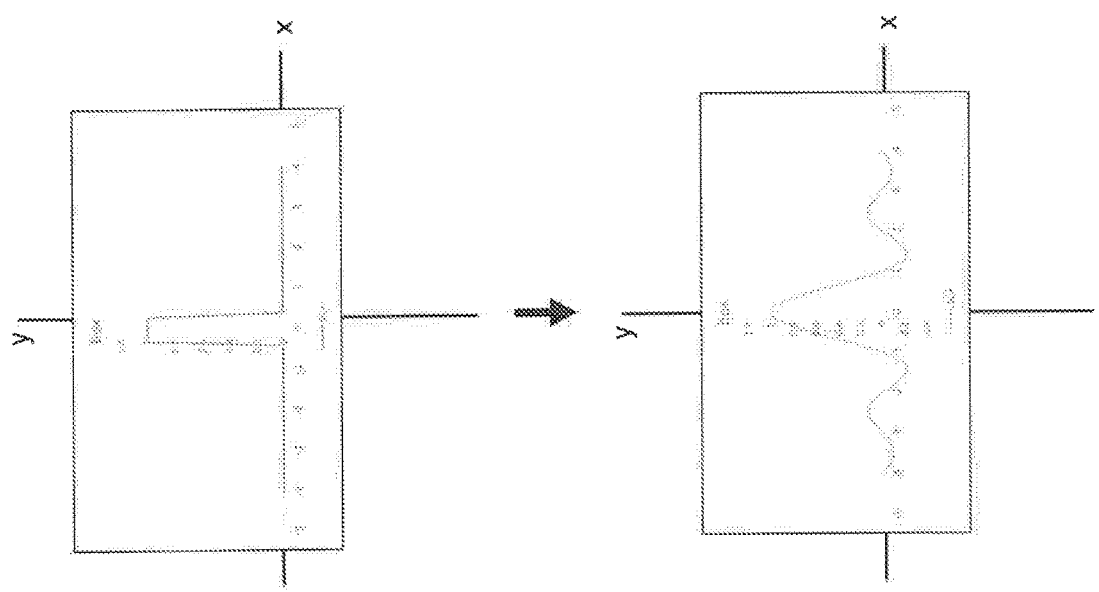

As an example of the mathematical process to generate a sparse transmitting array, a uniformly circular aperture is sometimes described as a top hatted square beam. In FIG. 6A, a spatial Fourier Transform is taken of a step function showing zero intensity far from the vertical axis then jumping in intensity near the vertical axis. This transforms the aperture into a bright ring, with concentric rings of deceasing amplitude in the negative x and positive x directions. These bright rings are sometimes referred to as "Airy rings", but in this context, they are not defined by the Airy function.

The next step is shown in FIG. 6B, and involves employing a Dirac delta function to revise the aperture to an arbitrarily narrow width, such that it is assumed to be 1 right on the axis and zero everywhere else. In practical terms that represents a hole much smaller than a wavelength. Comparing this to the wave pattern of the step function, this pattern has a dimmer central peak and brighter fringe area and is of near-infinite width. A relationship useful in transmitting-array design can be seen from this application. For instance, the delta functions are at a/2, so the radius of ring is a/2. The period of its Fourier Transform is also a/2. This relationship allows one to control the width of fringes by controlling the radius of the rings.

The sharpness of a Gaussian beam's envelope can be controlled by controlling sharpness of the Gaussian function that makes up the ring. In other words, width of slits is b/2, and b defines the period of the enveloping (amplitude modulating) function. The next step is to mathematically convolve the two waves to generate a cross section of an annular ring of finite width, which is seen in FIG. 6C. FIG. 6C (top) shows a cross-section of an annular ring of finite width, and FIG. 6C (bottom) shows the product of the Fourier Transforms at the bottoms of FIGS. 6A and 6B, which in this case is the product of: (A) a spatial Fourier Transform with finite width, and (B) a spatial Fourier Transform of infinite (or near infinite) width.

Figure 6D:
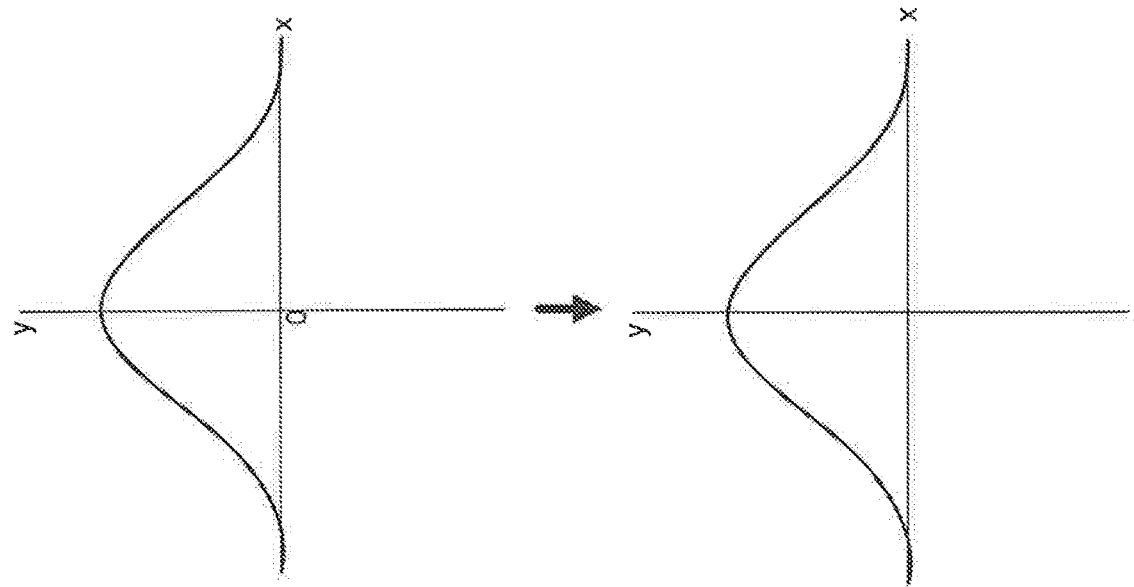
Figure 6C:
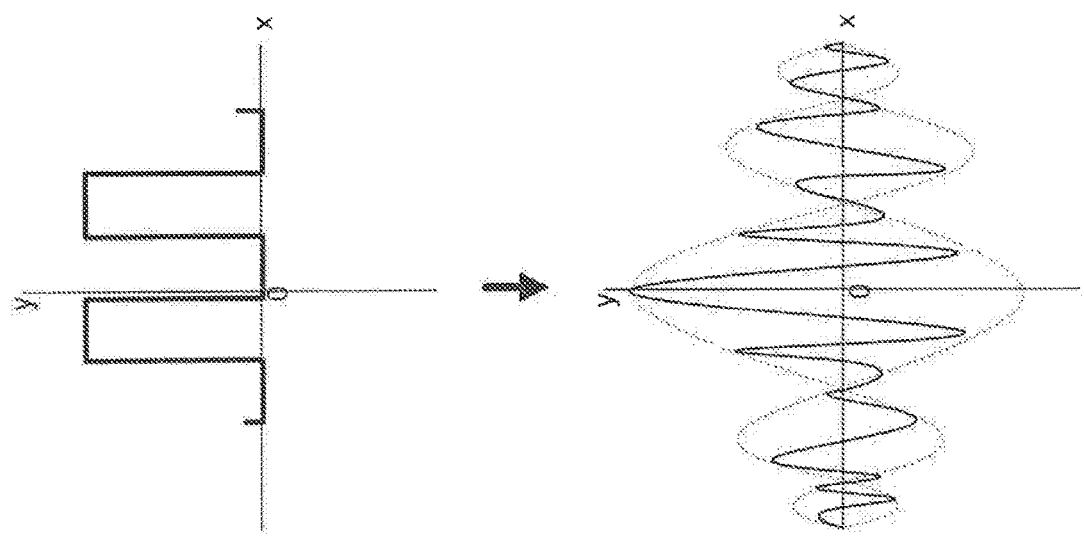

As noted herein, the spatial Fourier Transform of an on-axis Gaussian is a Gaussian distribution, as shown in FIG. 6D. FIG. 6E shows the result if add a Gaussian off-axis rotated around the axis (similar analysis to the combination of FIGS. 6A and 6B) such that, if FIGS. 6B and 6D are combined, this results in a Gaussian rotated around the axis as shown in FIG. 6E.

Figure 7:
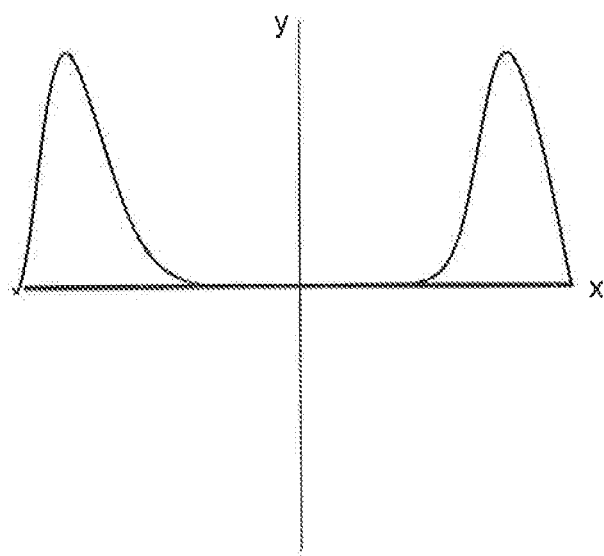
FIGS. 7 and 8 illustrate examples of techniques for designing sparse arrays to transmit Whisper Beams.
Figure 7:
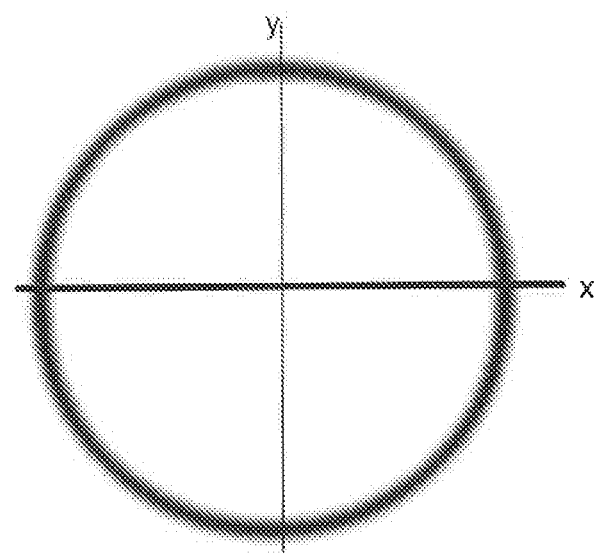

FIG. 6E (top) illustrates a Gaussian tapered annulus, in the form of a Gaussian function displaced from the vertical axis and rotated symmetrically around the vertical axis. A top-down view of this is shown in FIG. 6E (bottom). The Gaussian tapered annulus is a short period wave modulated by a decaying sinusoid. FIG. 7 (bottom) shows an in-plane (top-down) view of FIG. 6E.

Figure 8:
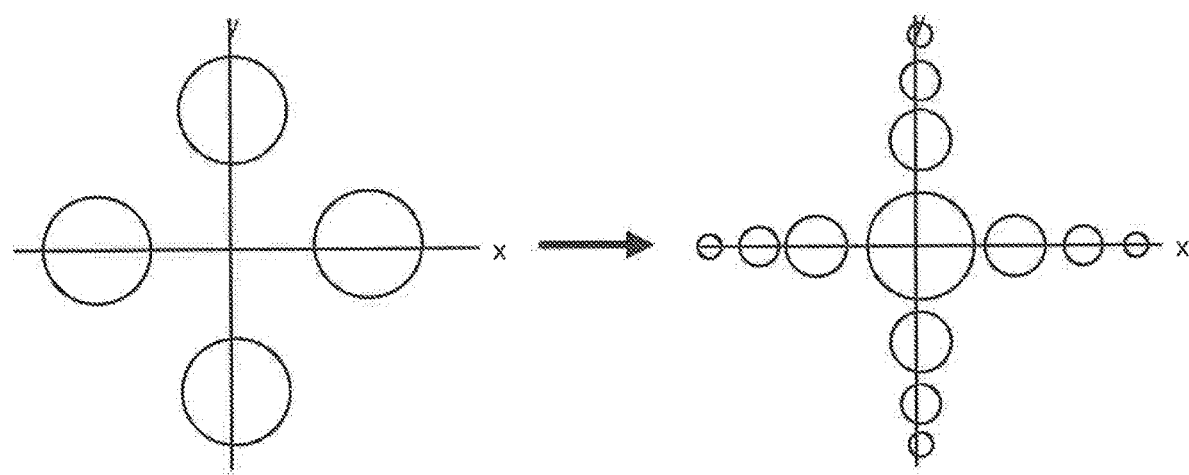

The mathematical techniques discussed in the preceding paragraphs can be used to design transmission arrays that are sparse or otherwise non-axisymmetric. Two examples are shown in FIGS. 7 and 8. In each, a desired receiver configuration is shown on the right, and the appropriate transmitter configuration to achieve the desired reception pattern is shown on the left. The transmitter configuration is produced using the mathematical techniques described above.

Referring initially to FIG. 7, a sparse array with a circular receiver is illustrated. The sparse array may be useful when the receiver is structured to intercept a central spot and the subsidiary lobes can be ignored. This sparse array can be used to simulate transmission at 915 MHz (e.g., a radio frequency in the UHF band), with the transmitter placed at the equator (the position shown in "e" as illustrated in FIG. 5.). Referring now to FIG. 8, a sparse array with the illustrated pattern may be applied to a cross-shaped receiver, such as a receiver integrated into the outer mold line of a winged vehicle. In this form, some precision may be used in alignment with the transmitter.

Though FIGS. 7 and 8 illustrate two representative examples of transmission arrays grouped around a central point in a manner that varies with both radius and angel, other patterns may be generated using similar techniques disclosed within this specification. Another example of the range that can be achieved by Whisper Beams using the techniques described herein have been obtained from computer simulation of a beam formed by a sparse array placed at the equator (as illustrated in "e" in FIG. 5), and focusing power at a distance of 125 km, though other distances are also possible. Whisper Beams can also be modelled to focus power as far as 740 km, which is enough range for a ground station to power a satellite in low Earth orbit, or for a solar power collecting satellite to transmit power to the ground. The configuration enables the diffuse nature of the beam between transmitter and receiver, and economy of the transmission over this distance.

f. Additional Features

Various additional features can be applied and/or incorporated into the generation of Whisper Beams, as described within this specification. As one example, circular polarization (e.g., left-handed or right-handed) can used to be used for powering flight vehicles and satellites. In other instances, linear polarization can additionally or alternatively be used.

In some implementations, a beam signal can be originated from a target aircraft, which is referred to as a "pilot beam." The pilot beam can, for example, originate the vehicle's request for a power transmission. The pilot beam can also be used to convey payment information (e.g., credit card information) for power drawn, or assist with locating and "locking on" to the target (e.g., transmitting a GPS coordinate). Additionally, the pilot beam can be used for synchronization as individual elements can be synchronized by carefully controlling phase on a clock set around all the elements. For example, it may be helpful to have some signal coming from the target vehicle, with the transmitter using the sensed phase of the incoming signal to set the phase of the power signal. It might also be possible for the pilot beam and the power beam to be of the same phase. If signals on edges of array are desired to be 0.23 nanoseconds later than center, then the signals on the pilot beam will be the same. However, this may cause interference, or the power beam may overload the ground array's receiver or the pilot-beam's transmitter. The ground array can also distinguish received from transmitted signal, using the pilot beam to "gauge" the dynamic relationship. The ground transmitter would then adjust its frequency to one other than the pilot beam, while using the information in the pilot beam to adjust the ongoing phase of the power beam. In some instances, right-hand polarization may be used for a power beam and left-hand polarization for a pilot beam, or vice-versa.

In some implementations, a transmission array can be combined with other equipment. For example, a transmission module can be built into a photovoltaic cell. An array built from these combined cells can be used for both transmitting Whisper Beams and collecting solar energy. In this way, the overall installation cost would be shared by the two functions. In some instances, it can be advantageous to accumulate energy before transmission using a Whisper Beam array, for example, in batteries. Operators of solar collection arrays and wind turbines can find it desirable to accumulate energy, as it allows them to serve as a more-predictable supplier of power to the electrical grid. For some renewable-energy projects, an accumulator is an entry consideration, as the local utility may not purchase from them unless they can provide some reliability of supply. The same or similar accumulators can be used for Whisper Beam operations and for operation of solar arrays and/or wind turbines, which allows sharing cost between the multiple functions.

2. Wireless Power Transmission using Whisper Beams

In general, Airy Beams are paraboloidal in that they propagate in a parabolic shape around an axis of symmetry. In any region along the beam, a cross section through the beam gives a modified Airy function of intensity, forming a series of rings decreasing in intensity with radius. The rings are closely spaced at the first focus, then spread outward in an AADF mode such that a "diffuse core" Airy configuration is established and then, at what we have termed the equator, begins to transition to an AAF mode, which then results in a second focus. The focus refers to the region on the axis of symmetry in which the rings converge. This region may be of variable size depending on how tight a focus is desired, which (as seen below) depends on the number of transmission elements in the transmitter. The evolution of the phase and amplitude of the beam can be numerically simulated using paraxial diffraction equations. Stated another way, if the phase and amplitude at any plane were to match that which is predicted by a set of equations, it would propagate downstream in a similar manner to form the second focus.

In an Airy Beam, the amplitude of each successive ring decreases exponentially as the radius of the ring increases. When trying to reduce the number of transmitting elements and still get long range, it may be helpful to optionally truncate and concentrate power as much as possible in the first few rings. Beam designers can be used to limit the size of the transmission antenna, 'clipping' off the aperture, failing to form outer rings that have only a small to miniscule diminution of total range or power level.

FIG. 9 illustrates an example of an Airy Beam that is generated and propagated for wireless power transmission using a transmitter 902, as an example among other applications (e.g., radar). In this example, the transmitter 902 is a broadside array antenna that propagates an RF transmission downstream, which in FIG. 9 is from left to right. The RF transmission forms a first focus 904A, which results in an AADF region 906A downstream of the first focus 904A. The RF transmission then forms an AAF region 906B downstream and forms a second focus 904B. In some instances, the transmitter 902 is configured to generate the RF transmission depicted in FIG. 9 in similar manner as optically-generated beams exhibiting AAF characteristics as described throughout. In such instances, the transmitter 902 is configured based on mathematical expressions that numerically simulate the amplitude and phase distribution of the RF transmission.

As shown in FIG. 9, Airy rings converge near the first focus 904A. The amplitude and phase distribution in the immediate neighborhood of the first focus 904A is complex but can be numerically simulated using the paraxial diffraction equations from an initially-specified phase and amplitude distribution. For example, there is a region of focus, which in normalized coordinates is ~1 "z unit" in length (where the z scaling is $2\pi(r_0^2)/\lambda$, and $r_0$ is the scaling parameter for radius), where all the Airy rings cross through an R=0 axis.

A receiver (not shown in FIG. 9) can be placed at or nearby the second focus 904B to receive an RF power transmission resulting from the Whisper Beam propagation as shown in FIG. 9. The Airy rings spread out to a large circular Airy beam with a hollow core, which allows dispersal of electromagnetic energy in the AADF region 906A and the AAF region 906B between the first focus 904A and the second focus 904B (and thereby the transmitter 902 placed at or nearby the first focus 904A and a receiver placed at or nearby the second focus 904B). However, due to paraboloid spreading of the Airy Beam, loss of power received at the receiver is minimized even if objects are placed in the beam along the direction of propagation.

Figure 10A:
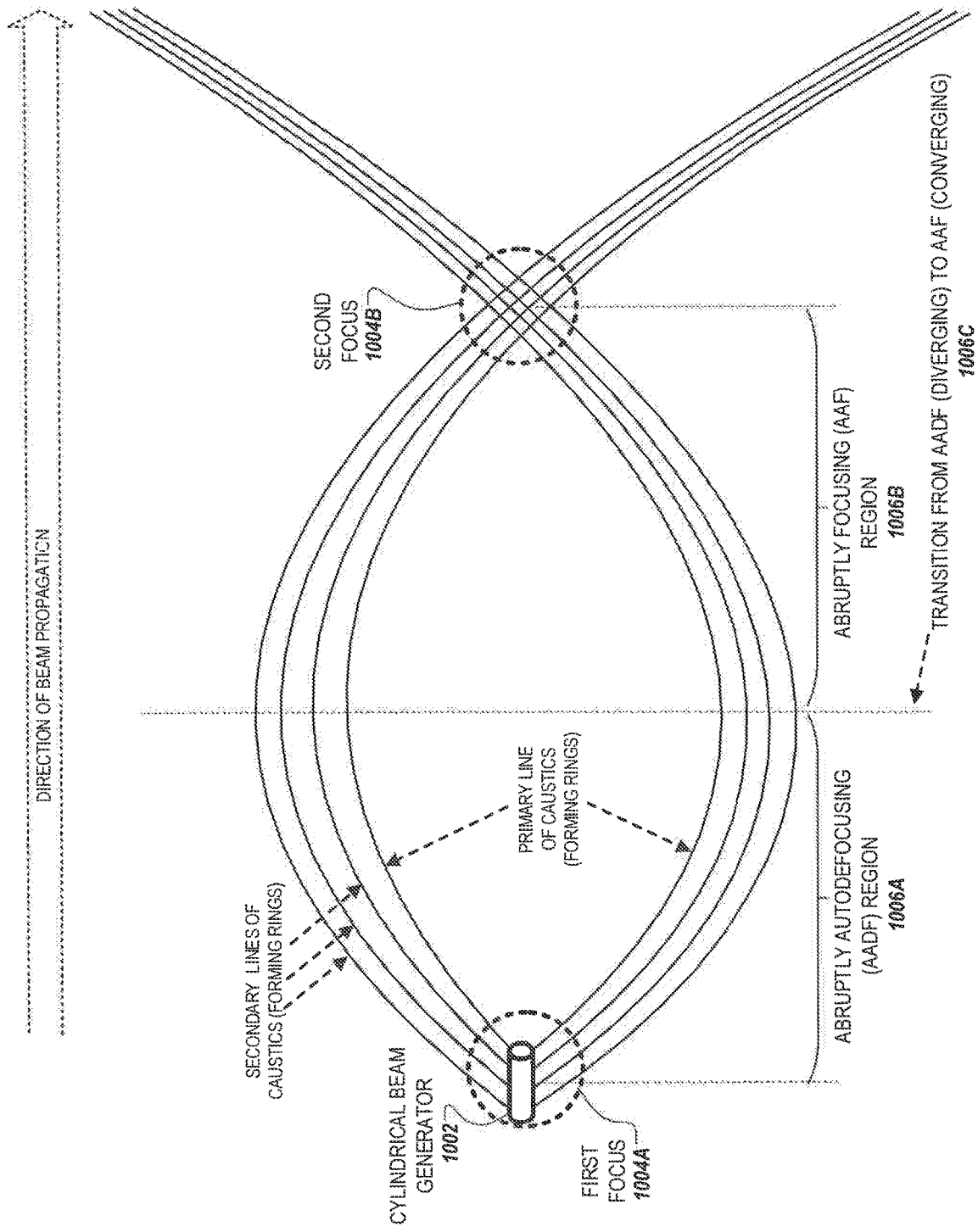
FIG. 10A illustrates an example of an RF Airy Beam that is generated and propagated for wireless power transmission using a cylindrical linear array antenna.
Figure 10B:
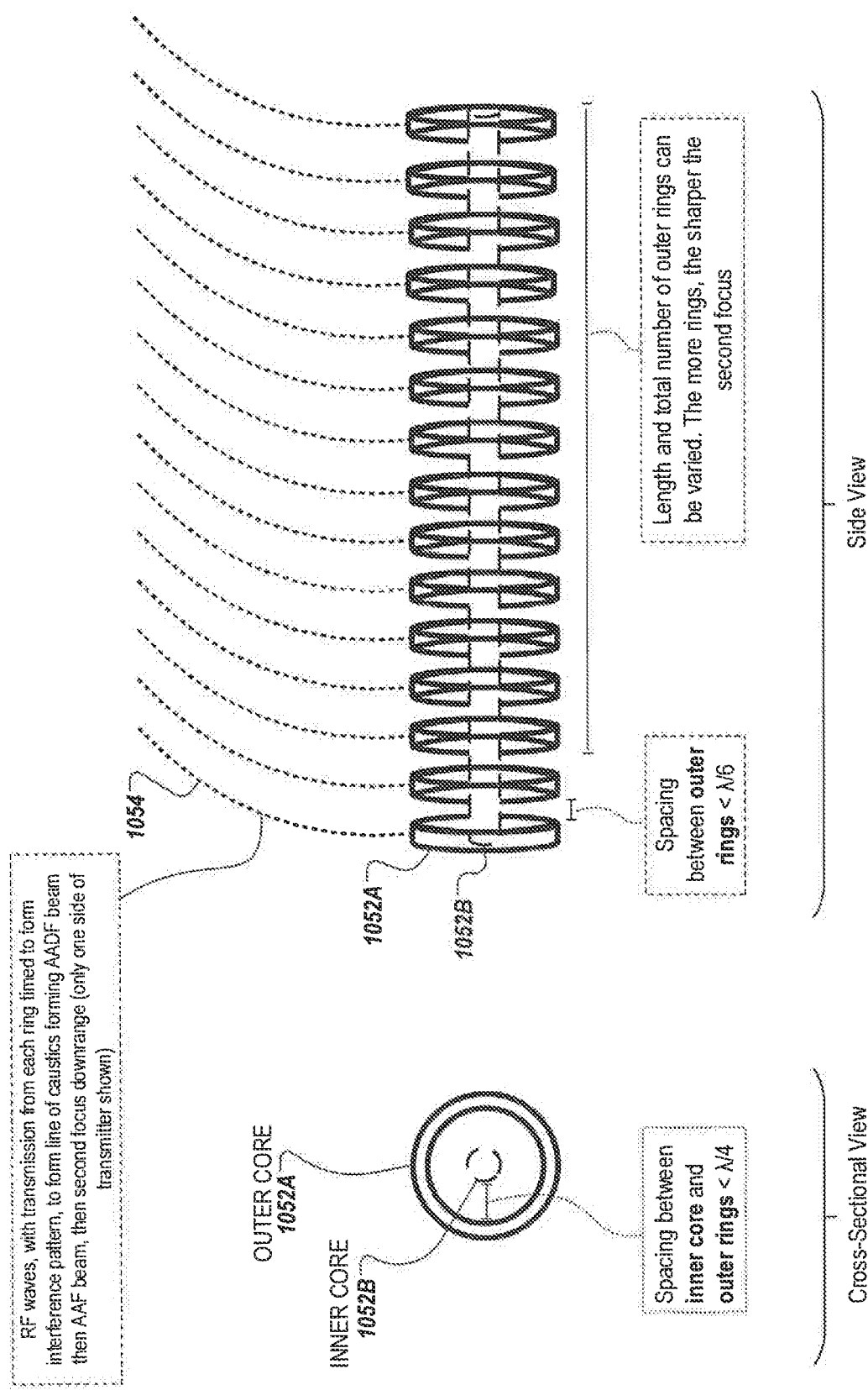
FIG. 10B illustrates an example antenna structure for a cylindrical linear array antenna used to generate and propagate an RF Airy Beam for wireless power transmission.

FIG. 10A illustrates an example of an Airy Beam that is generated and propagated for wireless power transmission using a transmitter 1002. In this example, the transmitter 1002 is a cylindrical linear array antenna, e.g., an end fire array antenna, that lies along an R=0 axis that is matched to the same amplitude and phase distribution of the Whisper Beam to generate a paraboloid beam starting from that point. The Whisper Beam is radially polarized, which implies that the transmitter 1002 could be realized as a series of rings of radius of approximately λ4, arranged along an axis along the required length as shown in FIG. 10B and discussed in greater detail below.

The transmitter 1002 propagates an RF transmission downstream, which in FIG. 10A is from left to right. The RF transmission shown in FIG. 10A begins at or near a first focus 1004A, which results in an AADF region 1006A downstream of the first focus 1004A. The RF transmission then forms an AAF region 1006B downstream and forms a second focus 1004B. As shown, the transmitter 1002 can be placed at or nearby a first focus 1004A as shown in the example depicted in FIG. 10A (rather than upstream of the first focus as shown in FIG. 9). The transmitter 1002 can be appropriately sized to ensure an adequate focus (i.e., sharpness) at the second focus 1004B. Examples of lengths for the transmitter 1002 include a length of less than or approximately equal to $2\pi(r_0^2)/\lambda$.

FIG. 10B illustrates an example antenna structure for a cylindrical linear array antenna used to generate and propagate a Whisper Beam for wireless power transmission. In this example, the antenna is mechanically steerable, such as an end fire antenna that can be constructed by stacking a set of rings 1052A around an inner core 1052B to form a cylinder. The each ring within the set of rings 1052A could be spaced with reference to a chosen transmission wavelength λ. Examples of ring spaces can be less than λ/4, less than λ/6, or approximately λ/10. The set of rings 1052A can produce RF waves 1054 that forms the Whisper Beam at the first focus 1004A depicted in FIG. 10A, with the beam propagating to the second focus 1004B depicted in FIG. 10A.

In one particular implementation, rings included in the set of rings 1052A are approximately λ/4 in radius and each spaced ~λ/10 apart along the longitudinal axis of the cylindrical array. For example, for a wavelength λ of 44 meters (6.78 MHz), a linear-array transmitter that focuses ~100 km down range could be ~1.4 km long. As a result, a linear antenna placed at the first focus 1004A could be almost two orders of magnitude smaller than a broadside antenna placed further upstream.

The inner core 1052B can be constructed from a single conductor of equal potential along its entire length. Alternatively, the inner core 1052B can be divided into separate inner core rings so that each inner core ring is driven at different times to produce different designated wave patterns.

The length of the cylinder (i.e., the number of rings included in the set of rings 1052A that are spaced apart from one another) impacts the size of the three-dimensional volume that is formed at the second focus 1004B, and the strength of the electromagnetic field that is formed within that volume. This can be thought of as the "sharpness" of the focus, understanding it is three dimensions. Decreasing the number of rings in the transmitter 1002 can still form the Whisper Beam, but the volume of the second focus 1004B will be larger and therefore less "sharp". As described above, the first focus 904A is highly-complex and often involves variation in phase and frequency on a scale smaller than the transmission wavelength. Antenna elements can be spaced less than a wavelength (probably <0.1 k) to address this complexity.

In some implementations, the transmitter 1002 is an antenna that is fixed in place to form the second focus 1004B at the same point downrange from the transmitter 1002 without movement, or along a line moving toward or away from the transmitter 1002 in the z dimension. Alternatively, to change the target location of the second focus 1004B in the x and/or y axis, e.g., to track a moving vehicle moving from left to right when viewed from the transmitter 1002 (or top to bottom in FIG. 10B), the transmitter 1002 can be made to follow a pre-set track (e.g., path of movement) in three dimensions, or mechanically steerable in one or more dimensions.

Figure 11:
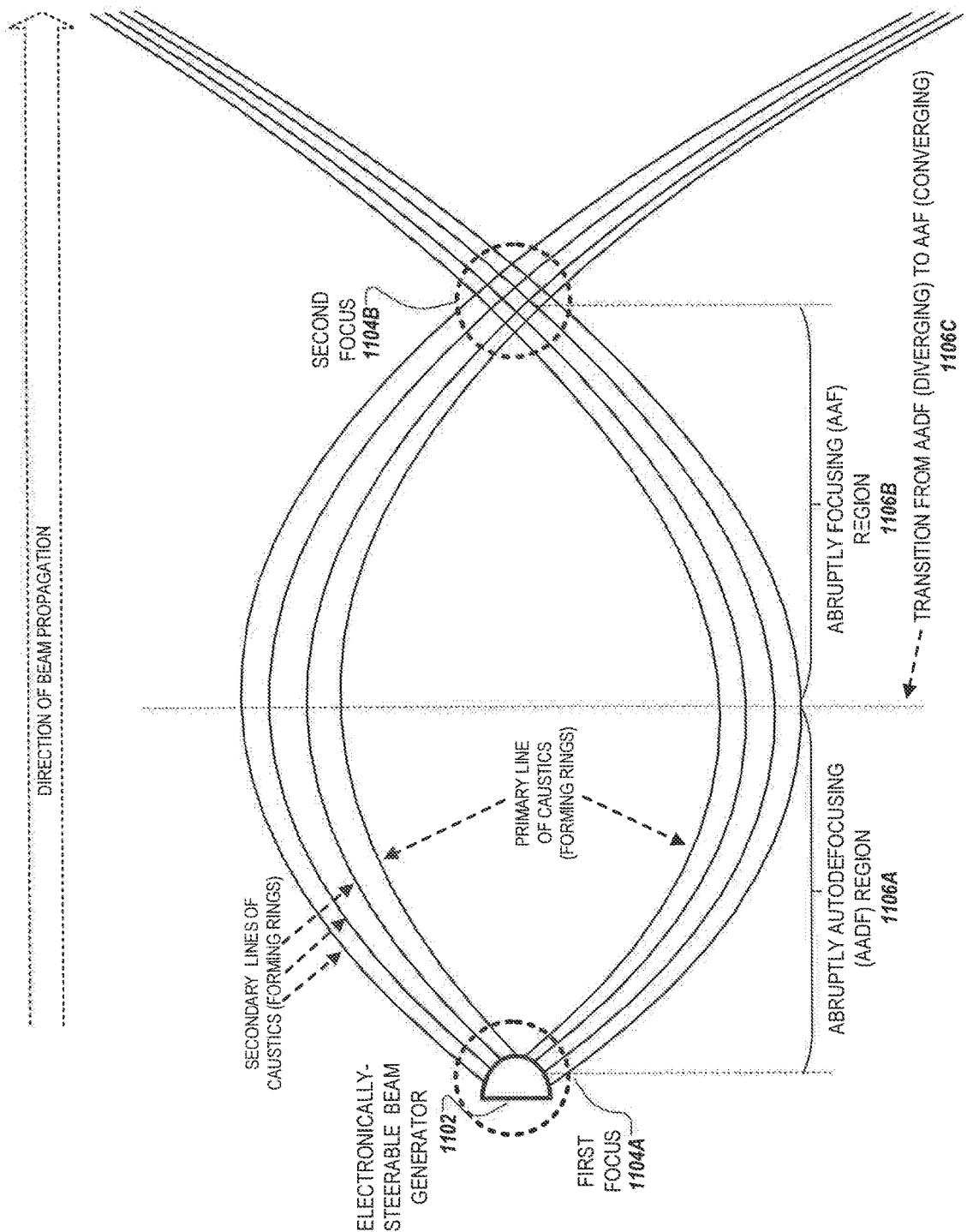
FIG. 11 illustrates an example of an RF Airy Beam that is generated and propagated for wireless power transmission using a hemispherical electronically-steerable antenna.

FIG. 11 illustrates an example of a Whisper Beam that is generated and propagated for wireless power transmission using a transmitter 1102. In this example, the transmitter 1102 is an electronically-steerable antenna that lies along an R=0 axis that is matched to the same amplitude and phase distribution of the Whisper Beam to generate a paraboloid beam starting from that point. The transmitter generates the phase and amplitude distribution on the surface of the transmitter that would otherwise correspond to the region of a first focus.

The transmitter 1102 propagates an RF transmission downstream, which in FIG. 11 is from left to right. The RF transmission shown in FIG. 11 forms a first focus 1104A, which results in an AADF region 1106A downstream of the first focus 1104A. The RF transmission then forms an AAF region 1106B downstream and forms a second focus 1104B. As shown, the transmitter 1104 can be placed at or nearby a first focus 1104A (rather than upstream of the first focus as shown in the example depicted in FIG. 9).

The electronically-steerable antenna can be configured in a variety of shapes. In some implementations, the volume of the transmitter is enclosed within the surface of the antenna. For example, the transmitter 1102 can be shaped as a hemisphere, to electronically steer (within the limits of the hemisphere) the area in which the second focus 1104B is formed, without mechanically moving the transmitter 1102. The hemispherical shape allows the transmitter 1102 to target formation of the second focus 1104B within a broad area downrange from the transmitter 1102.

In another embodiment, the transmitter 1102 can be spherical or ellipsoidal in shape around the first focus 1104A and generates the required phase and amplitude over the hemisphere (or hemi-ellipsoid) so that the downstream AADF Airy rings diverge from that surface to form the second focus 1104B.

The transmitter 1102 may include less than the complete number of transmitting elements (e.g., rings) in the array necessary to form a sharp second focus as discussed above.

Although the transmitter 1102 is depicted in FIG. 11 as being shaped as a hemisphere, in other implementations the transmitter 1102 can be other shapes. For example, the transmitter 1102 can be full sphere that is constructed to propagate a beam in any direction. Alternatively, the transmitter 1102 can be a quarter sphere that is constructed to propagate a beam in less than a half-sphere of three-dimensional space downrange from the transmitter 1002.

The implementations of the systems depicted in FIGS. 4A-D, 5, 6, 7, 8, 9, 10A, 10B, and 11 can be configured in multiple ways to provide different features and capabilities discussed above. For example, the maximum energy density of the Non-Gaussian Beam in the area between a transmitter and a receiver (e.g., the second focus) can be regulated, such that it does not exceed a pre-set threshold. For example, the threshold can be set at the point at which Watts per meter square ($W/m^2$) would not exceed a designated threshold for human exposure for the wavelength of electromagnetic energy being transmitted.

As another example, the system can be configured with a loop-back mechanism for confirming power transmission between the transmitter and receiver. The receiver could broadcast a small pilot beam back to the transmitter whenever situated in the proximity of the second focus thereby receiving power transmission from the Non-Gaussian Beam. The pilot beam could also be used to report the energy density of the Non-Gaussian Beam at a particular location, such as the receiver location. Receipt of the pilot beam by the transmitter can be used to confirm that the power-transfer beam is on target on the receiver. Alternatively, if the pilot beam signal is lost, diminished, or non-existent, the power-transfer beam can slew to reengage the target receiver, reduce power, and/or shut down the transmitter to conserve energy.

In some implementations, the system includes multiple transmitters that are configured to transmit power to one or more receivers. In some implementations, the two or more transmitters are time-domain multiplexed. Alternatively, in other implementations, the transmitters are phase-locked. The multiple transmitters can be redundantly configured so that the receiver can continue to receive power even if the second focus from one or more transmitters strays from the receiver, or otherwise loses its 'lock' on the target, or otherwise malfunctions. The redundant configuration can also be used to lower the intensity of the electromagnetic field at any point or location other than the focus. This technique can be useful in dense applications, such as operating a receiver device at an airport or truck terminal where there are multiple target receivers simultaneously drawing power transmission from multiple transmission beams. The operating frequency of the transmitters can also be altered. For example, in some implementations, "frequency hopping" is utilized, to continuously change the operating frequency to ensure the receiver is authorized to receive power from the transmitter, or to reduce jamming or harmful interference.

The systems described above can be configured with different types of receiver architectures to permit wireless power transmission over long distances using a Non-Gaussian Beam. The receiver can be configured for RF coupling.

In other implementations, longer wavelengths can be used. For example, an aircraft or space-launch vehicle might drag a wire antenna several kilometers long to couple with the RF Non-Gaussian Beam.

In other implementations, the receiver includes a compact receiver antenna architecture. For example, a dipole receiving antenna can receive wavelengths longer than the antenna, thereby allowing a smaller antenna to be carried on a moving vehicle to receive power from the transmitter. In some implementations, the receiving antenna can be made even more compact, such as an "electrically short" antenna, or an antenna that incorporates slow-wave structures. This can be particularly helpful when the wavelength is substantially longer than the receiving vehicle, as the receiving vehicle can intercept energy from a region of the beam that is larger than the vehicle. This mode of operation is an advantage of using RF wavelengths, and a vehicle would be much longer than an optical wavelength.

Figure 12:
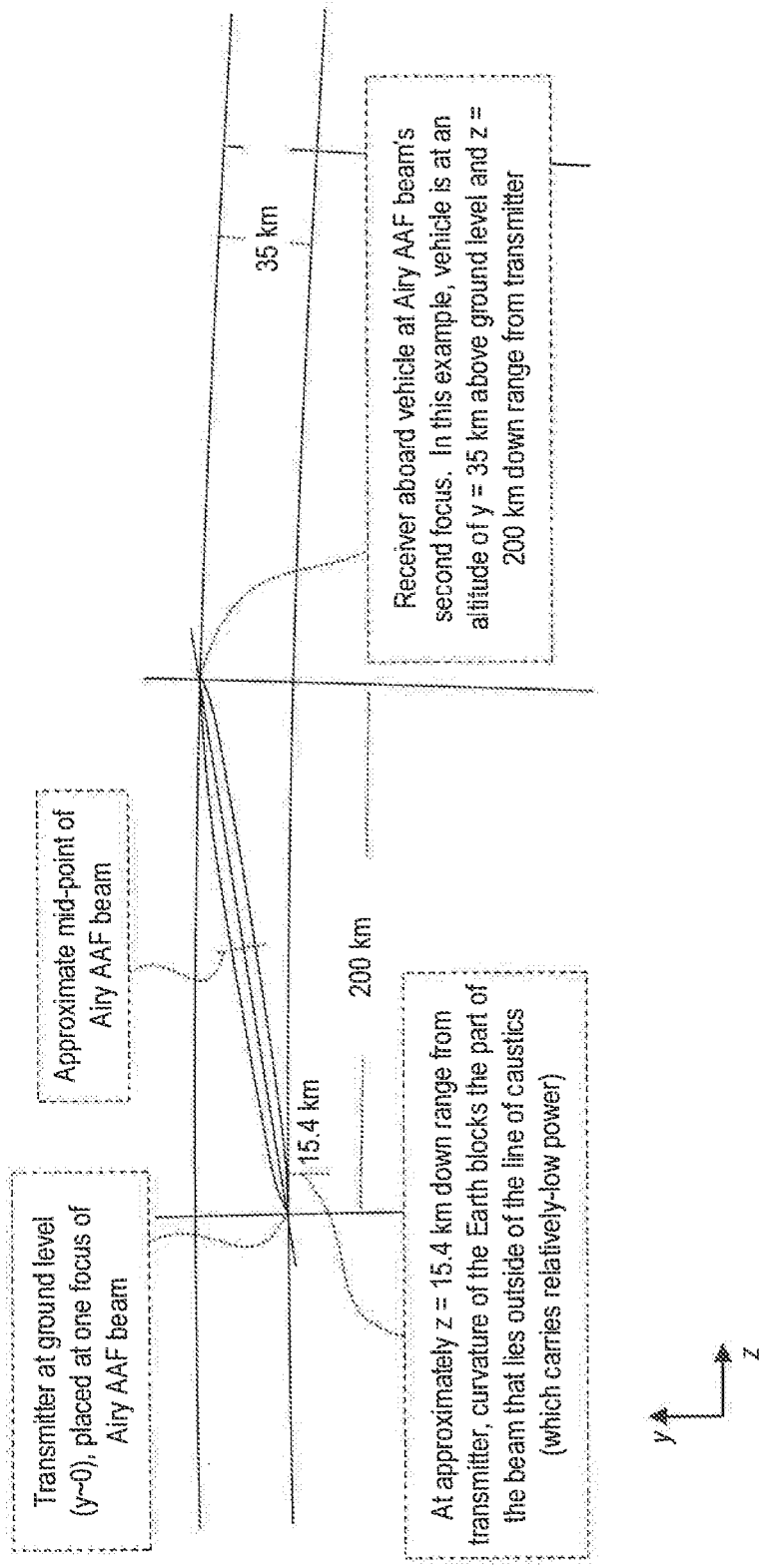
FIG. 12 illustrates an example of a technique for using a terrestrial transmitting antenna to project an RF Airy Beam over the Earth's horizon.

FIG. 12 illustrates an example of a technique for using a terrestrial transmitting antenna to project a Whisper Beam over the Earth's horizon. In this example, the transmitter can be a mechanically steerable antenna or an electronically steerable antenna as discussed above. The technique allows large portions of the beam's power to be transmitted over the Earth's horizon, which can be used for powering flight vehicles.

In the example depicted in FIG. 12, a transmitter is positioned at ground level and at one focus of a Whisper Beam (e.g., the first focus 904A depicted in FIG. 9). The location of the transmitter is used as a reference point so that its coordinate location is represented as y=0 and z=0 along the coordinate axis shown in FIG. 12. A receiver is placed aboard an aerial vehicle at the second focus of the Whisper Beam (e.g., the second focus 904B depicted in FIG. 9). The vehicle is placed at a vertical altitude of y=35 km above ground level and a horizontal distance of 200 km downrange from transmitter. In this example, at a certain horizontal distance downrange from the transmitter (approximately 15.4 km), the curvature of the Earth blocks the part of the Whisper Beam that lies outside of the line of caustics (which carries relatively-low power). However, as discussed above, even if the beam is partially obstructed, energy in the center, top and sides of the Whisper Beam are capable of reaching over the horizon and less power is in the bottom portion that is obstructed by the horizon.

In some instances, the cross-sectional shape of the line of caustics formed by the Whisper Beam can be altered to form an oval-shaped cross section, which would allow more of the total beam energy to arrive at the receiver if the beam is partially obstructed by the horizon.

As described throughout, the systems and techniques disclosed herein are distinct from many other systems and techniques that are typically used to generate optical beams.

For example, with respect to Airy Beams, the means of generation of some optical systems is that a transmitter is placed on an initial plane upstream of a first focus of the AADF beam and the intensity and phase distribution are produced of the Fourier transform of the desired beam intensity and phase distribution. A lens is then used to generate the Fourier transform of that initial distribution. In some implementations of Whisper Beams discussed above, the transmitter used in the systems is placed at or nearby the first focus to provide more fine-tuned control over the generated Whisper Beams.

Additionally, placing the transmitter at the first focus allows a much more compact transmitting antenna system. Indeed, antenna architectures typically used to generate optical beams that are not configured in this manner are often too long to be practical lower frequencies and/or for long-distance power transfer. It is noted that the effective radius of the initial generating beam is larger than (though comparable to) the radius of the resulting beam. For example, a broadside array in the Fresnel zone can be used, which means the focus is not further away in the z direction than the size of the antenna array in the x or y directions. It would be highly impractical to build such a large radius antenna for long-distance power transfer using RF wavelengths (including microwaves). For example, to transmit power ~100 kilometers away with a broadside RF antenna would require the antenna array to be ~100 kilometers in radius. If this were a dish antenna, it would be an impractical size of 200 km wide and ~200 km high.

The systems and techniques discussed throughout can be implemented in a variety of wireless power transmission applications. In some implementations, the technology can be used to power flight vehicles. For example, a transmitter can be placed on or adjacent to the ground (z=0 m) to supply power to aerial vehicles while in flight, including aircraft, unmanned autonomous vehicles (UAVs), urban air mobility vehicles (UAMs), and space-launch vehicles.

In other implementations, the technology can be used to provide ship-to-ship power. For example, an aircraft or other flight vehicle can transmit power to another aircraft or flight vehicle, such as to extend the range of the receiving aircraft, whether for routine flights or in an emergency. The transmitting vehicle could itself be receiving a transmission from the ground or another aircraft for relay transmission to the final aircraft.

In some other implementations, the technology can be used to provide space-based solar power. This approach can also be used to transmit energy from Earth orbit or beyond. For example, a spacecraft can collect solar energy (e.g., by using solar panels or other methods), and solar energy can be fed into an RF transmitter aboard the spacecraft. The transmitter can form the first focus point of a RF Whisper Beam as discussed above. The receiver would be located at the second focus of the RF Whisper Beam, which can be on the ground or onboard another spacecraft, among others. In these examples, use of the RF Whisper Beam would reduce the electromagnetic field strength in the area between the transmitter and the receiver, such that aircraft and wildlife flying though the beam would encounter minimized electromagnetic field strength, while a much higher energy density would be experienced at the receiver. A receiver would collect energy for distribution and use, such as supplying power to an electrical grid on the ground, or to a remote location on the ground. The satellite could also beam power direct to a mobile vehicle, such as an aircraft, UAV, or UAM in flight, or a ship at sea, or a ground vehicle. In some embodiments, the frequency may be selected to maximize absorption by the atmosphere, such that little or no power will reach the surface of the Earth under the target receiver.

In some other implementations, the technology can be used to provide power from a ground transmitter to a ground receiver, such as a receiver on a surface vehicle. For example, power can be provided to, without limitation, ships on the ocean, ships docked in ports, ships on rivers and other waterways, railroad trains, trucks, cars, and other moving vehicles. In these examples, the receiver could be mounted on the vehicle, at a second focus of the RF Whisper Beam, and the transmitter could be located on the mainland, islands, buoys, or along train tracks or roadways. In some instances, this configuration allows a vehicle to receive power from the RF Whisper Beam and then relay the received power to other distant vehicles.

In some implementations, the technology can be used to provide power underwater. For example, a transmitter can be placed on or around a vessel on the surface of the water (e.g., a ship or buoy) to power stationary equipment or vehicles underwater, e.g., remotely operated underwater vehicles (ROVs), unmanned underwater vehicles (UUVs), or autonomous underwater vehicles (AUVs). In other examples, the transmitter can also be placed underwater, and the receiver on the surface of the water.

In some implementations, the technology can be used to provide point-to-point ground power in applications where high power is needed over long distances. For example, a receiver can be placed on an island, and power can be transmitted from a central power-generating station on an adjacent island or on a nearby mainland. The same approach could also be used in response to a natural disaster or other emergency, using RF Whisper Beams to temporarily supply power to a receiver in an area during a blackout or other disruption of part of the wired electrical grid.

The systems and techniques disclosed herein can also be used for radar imaging. For example, if the location of an object is approximately known by other means, the systems and techniques disclosed herein can be used to place a second focus in the vicinity of the target and thereby provide higher reflected power to be sensed by radar receivers.

FIG. 13 illustrates an example of a process 1300 for generating a Whisper Beam. At 1310, a first antenna is configured to transmit a beam of electromagnetic energy. For example, a transmitter can be configured to transmit an RF beam. As discussed above with respect to FIGS. 4A-D, the transmitter can be configured to transmit two or more coherent out-of-phase Gaussian Beams along a propagation axis to generate the RF beam transmission. The RF beam forms a focus (e.g., the second focus) along the propagation axis and is formed as a diffuse-core beam (i.e., a beam with an intensity along the propagation axis that is less than a highest intensity of the beam off the propagation axis).

In some implementations, the process 1300 can be employed to generate a Non-Gaussian Beam in the form of an Airy Beam. As shown in FIG. 10A, such implementations, the beam propagates in an AADF fashion in the AADF region 906A from the first focus 904A to the equatorial plane 906C of the beam along a propagation axis. The beam transitions to an AAF beam at the equatorial plane 906C of the beam and propagates through the AAF region 906B to form the second focus 904B of the beam along the propagation axis.

At 1320, a second antenna is configured to receive a signal (or transmission) associated with the beam. For example, a receiver can be configured to receive a wireless power transmission signal that is generated by the beam. The receiver can be placed at or near the second focus 1004B of the beam along the propagation axis. In some implementations, the signal received by the second antenna includes a wireless power transmission signal. In other implementations, the signal received by the second antenna includes a radar signal.

In some implementations, the beam has a transmission wavelength k. For example, if an Airy Beam is employed, the transmitter 1002 can be placed within 20λ, of the first focus 1004A. In other implementations, the transmitter 1002 is placed nearby another antenna that has an aperture of less than ½ of the width of the beam. In some implementations, a frequency of the beam is less than 300 GHz, e.g., between 100-200 kHz, 100-300 kHz, or 200-300 kHz.

In some implementations, the transmitter 1002 includes an inner core that extends longitudinally in along the propagation axis and a linear array of conductive elements surrounding the inner core. In such implementations, each of the conductive elements are spaced apart at a distance along the propagation axis. For example, as shown in FIG. 10B, the transmitter 1002 includes the inner core 1052B and an outer core with a plurality of rings 1052A. As discussed above, the outer core includes a linear array of rings that are each spaced at a specified distance relative to the wavelength λ, of the beam. Examples of such distances are approximately less than λ/4, less than λ/6, or less than λ/10.

In some implementations, the linear array of conductive elements of the outer core 1052A include a linear array of conductive rings that each have a first diameter. The inner core 1052B has a second diameter, and the difference between the first diameter and the second diameter is less than λ/4.

In some implementations, the first antenna includes a mechanically steerable antenna, as in the example depicted in FIG. 10A. In other implementations, the first antenna includes an electronically steerable antenna, as in the example depicted in FIG. 11. The electronically steerable antenna can have a spherical shape, a hemispherical shape, or other types of appropriate shapes.

In some implementations, the process 1300 further includes configuring a third antenna to transmit the beam. The third antenna can be configured to transmit the beam redundantly with the first antenna such that transmission intensity of the signal received by the second antenna is increased.

In some implementations, configuring the second antenna includes configuring the second antenna to determine whether the signal received by the second antenna satisfies a threshold. For example, the transmitter 1002 can be configured to determine whether a signal received by a receiver placed at or nearby the second focus 1004B satisfies a threshold, e.g., 1 watt wireless power threshold. The second antenna can also be configured to transmit a signal to the first antenna based on determining that the signal received by the second antenna satisfies the threshold. For example, the receiver can transmit a signal to the transmitter 1002 based on determining that the signal received at or nearby the second focus 1004B satisfies the threshold. This feedback mechanism can be used to adjust the configuration of the transmitter 1002 to improve signal reception by the receiver at or nearby the second focus 1004B.

In some implementations, the first antenna is configured such that the beam of electronic energy propagates along the propagation axis to exhibit two-dimensional lines, and in other implementations the first antenna is configured such that the beam of electronic energy propagates along the propagation axis to exhibit a circular or three-dimensional paraboloid shape, such as the beam shown in FIG. 10A.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications can be made without departing from the spirit and scope of the invention. In addition, other steps can be provided, or steps can be eliminated, from the described flows, and other components can be added to, or removed from, the described systems. Accordingly, other embodiments are within the scope of the following claims.

What is claimed is:

1. A method comprising:
   configuring an antenna to transmit two or more coherent out-of-phase Gaussian beams along a propagation axis to generate a beam of electromagnetic energy that:
   propagates along the propagation axis,
   forms a focus along the propagation axis, and
   has an intensity along the propagation axis that is less than a highest intensity of the beam off the propagation axis.

2. The method of claim 1, wherein:
   the two or more coherent out-of-phase Gaussian beams comprise a first Gaussian beam and a second Gaussian beam; and
   the first Gaussian beam and the second Gaussian beam are transmitted co-axially along the propagation axis such that transmission of the first Gaussian beam and the second Gaussian beam produces an interference pattern forming a series of annular rings extending along the propagation axis.

3. The method of claim 1, wherein the antenna comprises at least thirty conductive elements.

4. The method of claim 3, wherein the at least thirty conductive elements are configured to have a directivity attribute such that power transmission produced by the beam in a first direction corresponding to propagation of the beam is at least four times greater than power transmission in a second direction that is opposite to the first direction.

5. The method of claim 3, wherein:
   the at least thirty conductive elements are arranged around a radius of a central point along the propagation axis;
   the focus is located in a first plane along the propagation axis that is not a second plane along the propagation axis in which the antenna is located; and
   an intensity and a phase in the second plane is based at least partially on the radius of the central point along the propagation axis.

6. The method of claim 1, wherein the antenna is placed at a first location and configured such that the beam:
   propagates in an abruptly autodefocusing fashion; and
   transitions to an abruptly autofocusing beam at the equatorial plane of the beam to form the focus.

7. The method of claim 1, wherein the intensity comprises a measured intensity of the beam at a midway point between the focus and the antenna.

8. A system comprising:
   an antenna to transmit two or more coherent out-of-phase Gaussian beams along a propagation axis to generate a beam of electromagnetic energy that:
   propagates along the propagation axis,
   forms a focus along the propagation axis, and
   has an intensity along the propagation axis that is less than a highest intensity of the beam off the propagation axis.

9. The system of claim 8, wherein:
   the two or more coherent out-of-phase Gaussian beams comprise a first Gaussian beam and a second Gaussian beam; and
   the first Gaussian beam and the second Gaussian are transmitted co-axially along the propagation axis such that transmission of the first Gaussian beam and the second Gaussian beam produces an interference pattern forming a series of annular rings extending along the propagation axis.

10. The system of claim 8, wherein the antenna comprises at least thirty conductive elements.

11. The system of claim 10, wherein the at least thirty conductive elements are configured to have a directivity attribute such that power transmission produced by the beam in a first direction corresponding to propagation of the beam is at least four times greater than power transmission in a second direction that is opposite to the first direction.

12. The system of claim 8, wherein:
   the at least thirty conductive elements are arranged around a radius of a central point along the propagation axis;
   the focus is located in a first plane along the propagation axis that is not a second plane along the propagation in which the antenna is located; and
   an intensity and a phase in the second plane is based at least partially on the radius of the central point along the propagation axis.

13. The system of claim 8, wherein the intensity comprises a measured intensity of the beam at a midway point between the focus and the antenna.

14. The system of claim 12, further comprising:
   a second antenna, wherein the second antenna is (i) placed at a second location at or near a focus of the beam formed along the propagation axis and (ii) configured to receive a transmission associated with the beam.

15. A method comprising:
configuring an antenna to receive a transmission associated with a beam of electromagnetic energy; and
wherein the beam is generated based on two or more coherent out-of-phase Gaussian beams transmitted along a propagation axis such that the beam:
propagates along the propagation axis,
forms a focus along the propagation axis, and
has an intensity along the propagation axis that is less than a highest intensity of the beam off the propagation axis.

16. The method of claim 15, wherein configuring the antenna comprises:
configuring the antenna to determine whether transmission of the beam satisfies a threshold; and
configuring, based on determining that transmission of the beam satisfies the threshold, the antenna to transmit a signal to a transmitter associated with transmission of the beam.

17. The method of claim 15, wherein transmission of the beam received by the antenna comprises a wireless power transmission signal.

18. The method of claim 15, wherein:
the two or more coherent out-of-phase Gaussian beams comprise a first Gaussian beam and a second Gaussian beam; and
the first Gaussian beam and the second Gaussian beam are transmitted co-axially along the propagation axis such that transmission of the first Gaussian beam and the second Gaussian beam produces an interference pattern forming a series of annular rings extending along the propagation axis.

19. The method of claim 15, wherein a frequency of the beam is less than 300 GHz.

20. The method of claim 15, wherein:
the beam has a transmission wavelength $\lambda$;
the antenna is placed at a location at or near an additional focus of the beam along the propagation axis; and
the antenna is placed within $20\lambda$ of the additional focus along the propagation axis.

* * * * *